United States Patent [19]

Usagawa et al.

[11] Patent Number: 5,208,137
[45] Date of Patent: May 4, 1993

[54] SILVER HALIDE PHOTOGRAPHIC LIGHT-SENSITIVE MATERIAL

[75] Inventors: Yasushi Usagawa; Yasuhiko Kawashima; Nobuaki Kagawa, all of Hino, Japan

[73] Assignee: Konica Corporation, Tokyo, Japan

[21] Appl. No.: 933,001

[22] Filed: Aug. 19, 1992

Related U.S. Application Data

[63] Continuation of Ser. No. 853,881, Mar. 18, 1992, abandoned, which is a continuation of Ser. No. 634,062, Dec. 26, 1990, abandoned.

[30] Foreign Application Priority Data

Dec. 28, 1989 [JP] Japan .................. 1-342348

[51] Int. Cl.$^5$ .................................. G03C 1/06
[52] U.S. Cl. ........................ 430/522; 430/510
[58] Field of Search ............ 430/511, 510, 522

[56] References Cited

U.S. PATENT DOCUMENTS

| | | | |
|---|---|---|---|
| 3,445,231 | 5/1969 | Nishio et al. | 430/522 |
| 4,294,916 | 10/1981 | Postle et al. | 430/522 |
| 4,311,787 | 1/1982 | Lemahieu et al. | 430/522 |
| 4,716,099 | 12/1987 | Simons | 430/510 |
| 4,818,659 | 4/1989 | Takahashi et al. | 430/522 |
| 4,830,950 | 5/1989 | Kuwabara et al. | |
| 4,857,446 | 8/1989 | Diehl et al. | 430/510 |
| 4,940,654 | 7/1990 | Diehl et al. | 430/510 |
| 4,948,717 | 8/1990 | Diehl et al. | 430/510 |

FOREIGN PATENT DOCUMENTS 274723 7/1988 European Pat. Off.
1909463 9/1969 Fed. Rep. of Germany.

OTHER PUBLICATIONS

Patent Abstract of Japan, vol. 9, No. 79 (p-347) (1802); Apr. 9, 1985 JPA -59-208548; Nov. 26, 1984.

*Primary Examiner*—Jack P. Brammer
*Attorney, Agent, or Firm*—Jordan B. Bierman

[57] ABSTRACT

A silver halide photographic light-sensitive material is disclosed. The photographic material contais fine solid particles of a compound represented by a formula of $$A = L_1 + L_2 = L_3)_m B$$

wherein A represents an acidic mother nucleus of 2-pyrazoline-5-one; B represents an aryl group which is substituted at 4th position thereof with an amino group having at least one of alkenyl, alkknyl or heterocyclic group or with a cyclic amino group; $L_1$, $L_2$ and $L_3$ each represent a methine group; m is an integer of 0 or 1; wherein A contains a carboxyphenyl, sulfonaminodophenyl or aminosulfonylaminophenyl group. The compound is used in a filter layer in the photographic material.

7 Claims, No Drawings

SILVER HALIDE PHOTOGRAPHIC LIGHT-SENSITIVE MATERIAL

This application is a continuation of application Ser. No. 07/85388 filed 3/18/92, now abandoned which is a continuation of application Ser. No. 07/634062, filed 12/26/90, now abandoned.

BACKGROUND OF THE INVENTION

This invention relates to a silver halide photographic light-sensitive material containing a benzyliden or cinnamylidene type dye and particularly to a silver halide photographic light-sensitive material in which a specific layer is dyed with a novel benzylidene or cinnamylidene type dye so that a fog production and an aging desensitization can be reduced.

For silver halide photographic light-sensitive materials, the high image qualities such as an excellent sharpness and an excellent color reproducibility are required.

In recent years, they have also been required to further shorten the processing time, that is, to have an ultrarapid processing aptitude so as to compete with the instant processability of an electrophotographic material. For realizing the high image qualities and the ultrarapid processing aptitude each having been required, the efforts have been made in the industry to make a layer more thinner and to optimize the silver halides and the raw materials such as the compounds to be added in.

For the purposes of improving the image qualities and controlling the sensitivity of a silver halide emulsion, it has been well known that a dye is contained in a silver halide photographic light-sensitive material. For example, such a dye has been used for preventing a halation and irradiation and in a light absorption filter.

Recently, the range of using the dyes has been widely increased, for example, in a dye useful in place of yellow colloidal silver in a color photographic light-sensitive material —hereinafter referred to as a 'YC dye'—, a dye for dyeing a crossover-cut layer in an X ray photographic light-sensitive material, and a dye for dyeing a non-light-sensitive emulsion layer in a graphic art photographic light-sensitive material.

For the dyes applicable for the above-mentioned purposes, the following characteristics are required to meet the various purposes:

1. An excellent absorption spectrum is to be provided;
2. No diffusion is to be produced from a dyed layer to the other layers;
3. Any light-sensitive silver halide emulsion is not to be affected photographically;
4. The dye is to be stable in any silver halide photographic light-sensitive material;
5. The dye is to be readily added;
6. The dye is to be stable in any emulsion coating solution and is not to affect any viscosity of the solution; and
7. No color is to remain after a light-sensitive material is processed.

There have been the proposals for numerous dyes so far to satisfy the above-mentioned requirements. For example, there have been the oxonol dyes proposed in British Patent —BP— No. 506,385 and Japanese Patent Examined Publication —JP EP— No. 39-22069/1964; the merocyanine dyes proposed in U.S. Pat. No. 2,493,747; and the styryl dyes proposed in U.S. Pat. No. 1,845,404. Besides the above, Japanese Patent Publication Open to Public Inspection —JP OPI— Nos. 1-196040/1989 and 1-196041/1989 disclose each the arylidene dyes.

The above-given dyes are generally used by dissolving them in either water or a water-miscible organic solvent and then by adding into a photographic component layer. However, if the dye is water-soluble, it does not remain in a subject layer to be dyed, but diffuses into the whole layer. When trying to achieve the original object, therefore, a large quantity of the dye should be added as much as the quantity diffused into the other layers, so that the other layers as well as the subject layer produce the undesirable phenomena such as a lowered sensitivity, a varied gradation and an abnormal fog production. When a light-sensitive material is aged in storage, in particular, a fogging or desensitizing phenomenon is seriously produced. If the quantity of the dye is reduced to avoid the above-mentioned phenomena, the original light-absorption effect cannot satisfactorily be obtained. For solving the above-mentioned problems, there has been the known dyes capable of dyeing a specific layer with inhibiting the diffusibility. As for the antidiffusible type dyes, for example, the YC dyes are described in U.S. Pat. Nos. 2,538,008, 2,539,009, and 4,420,555; and JP OPI Nos. 61-204630/1986, 61-205934/1986, 62-32460/1987, 62-56958/1987, 62-92949/1987, 62-222248/1987, 63-40143/1988, 63-184749/1988, and 63-316852/1988. The above-given dyes have been many proposed to save the valuable natural silver sources and to improve the defects that a color photographic component generally used, that is a yellow colloidal silver so called Carey Lea Silver, lowers a green sensitivity, because the silver absorbs not only blue rays of light but also the other color rays of light from a part of the long wavelength region; and that a fog production is increased in an adjacent layer.

The above-mentioned defects may be improved to some extent by the antidiffusible dyes and, on the other hand, thereby deteriorating a preservability and producing a desensitization in aging and, further, making a bleachability insufficient, so as to cause a new color staining problem. For solving the problem, a further new antidiffusible dye has been demanded.

It is, accordingly, an object of the invention to provide a silver halide photographic light-sensitive material capable of satisfying the above-described requirements for the antidiffusible dyes, reducing the fog production, and being improved in aging stability.

The silver halide photographic light-sensitive materials of the invention comprise each a support provided thereonto with at least one layer containing the fine solid particle dispersing elements of the compound represented by the following formula I:

Formula I

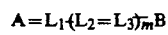

wherein A represents an acidic mother nucleus of 2-pyrazoline-5-one; B represents an aryl group which is substituted at the 4th position thereof with an amino group having at least one substituent selected from a group consisting of alkenyl, alkynyl and heterocyclic groups, or a cyclic amino group; $L_1$ through $L_3$ represent each a methine group; m is an integer of 0 or 1; wherein, A is to contain at least either one selected from the group consisting of carboxyphenyl groups, sulfonamidophenyl groups, aminosulfonylaminophenyl groups.

The invention will now be detailed below.

The amino group having at least one substituent substituted at the 4th position of the aryl group represented by B may be mono- or di-substituted amino group. In case of di-substituted amino group one of the substituents may be an alkenyl group, alkynyl group, or a substituent other than a heterocyclic group such as an alkyl, aryl or cycloalkyl.

The alkyl groups include, for example, a methyl group, an ethyl group, an n-propyl group, an iso-propyl group, a t-butyl group, an n-pentyl group, an n-hexyl group, an n-octyl group, a 2-ethylhexyl group, an n-dodecyl group, an n-pentadecyl group and an eicosyl group. The alkyl groups also include those having each a substituent. Such substituents include, for example; a halogen atom such as a chlorine atom, a bromine atom, an iodine atom and a fluorine atom; an aryl group such as a phenyl group, and a naphthyl group; a cycloalkyl group such as a cyclopentyl group and a cyclohexyl group; a heterocyclic group such as a pyrrolidyl group and a pyridyl group; a sulfinic acid group; a carboxyl group; a nitro group; a hydroxyl group; a mercapto group; an amino group such as an amino group and a diethylamino group; an alkyloxy group such as a methyloxy group, an ethyloxy group, an n-butyloxy group, an n-octyloxy group and an isopropyloxy group; an aryloxy carbamoyl group such as an aminocarbonyl group, a methylcarbamoyl group, an n-pentylcarbamoyl group, and a phenylcarbamoyl group; an amido group such as a methylamido group, a benzamido group, and an n-octylamido group; an aminosulfonylamino group such as an aminosulfonylamino group, a methylaminosulfonylamino group, and an anilinosulfonylamino group; a sulfamoyl group such as a sulfamoyl group, a methylsulfamoyl group, a phenylsulfamoyl group, and an n-butylsulfamoyl group; a sulfonamido group such as a methanesulfonamido group, an n-heptanesulfonamido group and a benzenesulfonamido group; a sulfinyl group such as an alkylsulfinyl group including a methylsulfinyl group, an ethylsulfinyl group, and an octylsulfinyl group, and an arylsulfinyl group including a phenylsulfinyl group; an alkyloxycarbonyl group such as a methyloxycarbonyl group, an ethyloxycarbonyl group, a 2-hydroxyethyloxycarbonyl group and an n-octyloxycarbonyl group; an aryloxycarbonyl group such as a phenyloxycarbonyl group and a naphthyloxycarbonyl group; an alkylthio group such as a methylthio group, an ethylthio group and an n-hexylthio group; an arylthio group such as a phenylthio group and a naphthylthio group; an alkylcarbonyl group such as an acetyl group, an ethylcarbonyl group, an n-butylcarbonyl group and n-octylcarbonyl group; an arylcarbonyl group such as a benzoyl group, a p-methanesulfonamidobenzoyl group, a p-carboxybenzoyl group and a naphthoyl group; a cyano group; a ureido group such as a methylureido group and a phenylureido group; and a thioureido group such as a methylthioureido group and a phenylthioureido group.

The cycloalkyl groups serving as the substituents to the amino groups include, for example, a cyclopropyl group, a cyclobutyl group, a cyclopentyl group and a cyclohexyl group. The cycloalkyl groups include those having each a substituent. Such substituents include those exemplified for the alkyl groups and for the substituents to the foregoing alkyl groups.

The aryl groups for serving as the substituents to the amino groups include, for example, a phenyl group and a naphthyl group. Such aryl groups include those having a substituent, and such substituents include those groups exemplified for the foregoing alkyl groups and for the foregoing substituents to the alkyl groups.

The alkenyl groups for serving as the substituents to the amino groups include, for example, a vinyl group, an allyl group, a 1-propenyl group, a 1,3-butadienyl group and a 2-pentenyl group. The alkenyl groups include those having a substituent, and the subsituents include those to the foregoing alkyl groups.

The heterocyclic groups serving as the substituents to the amino groups include, for example; pyridyl groups such as a 2-pyridyl group, a 3-pyridyl group, a 4-pyridyl group, a 5-carboxy-2-pyridyl group, a 3,5-dichloro-2-pyridyl group, a 4,6-dimethyl-2-pyridyl group, a 6-hydroxy-2-pyridyl group, a 2,3,5,6-tetrafluoro-4-pyridyl group, and a 3-nitro-2-pyridyl group; oxazolyl groups such as a 5-carboxyl-2-benzoxazolyl group, a 2-benzoxazolyl group, and a 2-oxazolyl group; thiazolyl groups such as a 5-sulfamoyl-2-benzthiazolyl group, a 2-benzthiazolyl group, and a 2-thiazolyl group; imidazolyl groups such as a 1-methyl-2-imidazolyl group, and a 1-methyl-5-carboxy-2-benzimidazolyl group; furyl groups such as a 3-furyl group; pyrrolyl groups such as a 3-pyrrolyl group; thienyl groups such as a 2-thienyl group; pyrazinyl groups such as a 2-pyrazinyl group; pyrimidinyl groups such as a 2-pyrimidinyl group, and a 4-chloro-2-pyrimidinyl group; pyridazinyl groups such as a 2-pyridazinyl group; purinyl groups such as a 8-purinyl group; isoxazolyl groups such as a 3-isoxazolyl group; selenazolyl groups such as a 5-carboxy-2-selenazolyl group; sulfolanyl groups such as a 3-sulfolanyl group; pyrazolyl groups such as a 3-pyrazolyl group; and tetrazolyl groups such as a 1-methyl-5-tetrazolyl group. Such heterocyclic groups include those having a substituent and the substituents include those exemplified for the foregoing alkyl groups and for the substituents to the alkyl groups.

The cyclic amino groups include, for example, those removed therefrom a hydrogen atom bonded to a nitrogen atom of piperidine, piperazine or morpholine, and the cyclic amino groups include those having a substituent. The substituents include those exemplified for the foregoing alkyl groups and for the substituents for the alkyl groups.

The aryl components of the aryl groups having at the 4th position thereof a substituted amino group or a cyclic amino group represented by B include, desirably, phenyl. The aryl components include, besides the 4-amino groups, those having a substituent. The substituents include those exemplified for the foregoing alkyl groups and the substituents for the alkyl groups.

The methine groups represented by $L_1$, $L_2$ and $L_3$ include those having a substituent, and the substituents include, for example; alkyl groups such as a methyl group, an ethyl group, a 3-hydroxypropyl group, and a benzyl group; halogen atoms such as a fluorine atom, a chlorine atom and a bromine atom; aryl groups such as a phenyl group; and alkoxy groups such as a methoxy group, and an ethoxy group. Each of these groups includes those having the substituents exemplified for the substituents to the alkyl groups serving as the substituents to the foregoing amino component.

The acidic mother nuclei of 2-pyroazoline-5-one represented by A include those having a substituent. The substituents at the 1st position include, for example, an alkyl group, an alkenyl group, a cycloalkyl group, an aryl group, and a heterocyclic group, and the substituents at the 3rd position include, for example, an alkyl group, an alkenyl group, a cycloalkyl group, an aryl group, a heterocyclic group, a carboxyl group, a carbamoyl group, an oxycarbonyl group, an amino group, an amido group, a ureido group, a sulfonamido group, an aminosulfonylamino group, a hydroxy group, an alkyloxy group, an aryloxy group, an acyl group, a cyano group, a sulfamoyl group, a sulfonyl group, a sulfinyl group, a mercapto group, an alkylthio group, and an arylthio group. The alkyl, alkenyl, cycloalkyl, aryl and heterocyclic groups each serving as the substituents at the meta-positions include those exemplified for the substituents to the 4-amino component of the foregoing 4-aminoaryl group, and these substituents include those having such a further substituent as those exemplified for the substituents to the aryl groups serving as the substituents to the foregoing 4-amino component.

The amino groups serving as the substituents at the 3rd position include, for example, an alkylamino group, a dialkylamino group, and an arylamino group. The alkyl and aryl groups include, for example, those exemplified for the alkyl and aryl groups serving as the substituents to the foregoing 4-amino component. They also include those having such a substituent as those exemplified for the substituents to the aryl groups serving as the substituents to the foregoing 4-amino component.

The oxycarbonyl groups serving as the substituents at the 3rd position include, for example, an alkyloxycarbonyl group, an aryloxycarbonyl group and a heterocyclic oxycarbonyl group; the acyl groups include, for example, an alkylcarbonyl group, an arylcarbonyl group and a heterocyclic carbonyl group; the carbamoyl groups include, for example, a carbamoyl group, an alkylcarbamoyl group, an arylcarbamoyl group, a heterocyclic carbamoyl group, and a nitrogen-containing hetercyclic carbonyl group such as a 1-piperidinocarbonyl group and a 4-morpholinocarbonyl group. The ureido groups include, for example, an alkylureido group, an arylureido group and a heterocyclic ureido group; the amido groups include, for example, an alkylcarbonylamino group, an arylcarbonylamino group and a heterocyclic carbonylamino group; the sulfonamido groups include, for example, an alkylsulfonylamino group, an arylsulfonylamino group and a heterocyclic sulfonylamino group; the aminosulfonylamino groups include, for example, an alkylaminosulfonylamino group, a dialkylaminosulfonylamino group, an arylaminosulfonylamino group and a heterocyclic aminosulfonylamino group; the sulfamoyl groups include, for example a sulfamoyl group, an alkylsulfamoyl group, an arylsulfamoyl group and a heterocyclic sulfamoyl group; the sulfonyl groups include, for example, an alkylsulfonyl group, an arylsulfonyl group and a heterocyclic sulfonyl group; and the sulfinyl groups include, for example, an alkylsulfinyl group, an arylsulfinyl group and a heterocyclic sulfinyl group. The alkyl, aryl and heterocyclic components contained each in the above-given groups, and the alkyl and aryl components contained each in the alkyloxy, aryloxy, alkylthio or arylthio group include, for example, those exemplified for the alkyl, aryl and heterocyclic groups each serving as the substituents to the foregoing 4-amino component, and they include those having such a further substituent as those exemplified for the substituents to the aryl groups serving as the substituents to the foregoing 4-amino component.

The compounds represented by Formula I has a carboxyphenyl group, a sulfonamidophenyl group or an aminosulfonylaminophenyl group. The sulfonamido and aminosulfonylamino groups are each exemplified by each of the groups serving as the substituents at the 3rd position of the acidic mother nuclei of 2-pyrazoline-5-one. The examples includes of a phenyl group having a carboxy group, aminosufonylamino group or a sulfonamide group, includes those having a substituent, whose examples are such substituent as an exemplified group serving as the substituents of the substituted amino group at the 4th position of the aryl group.

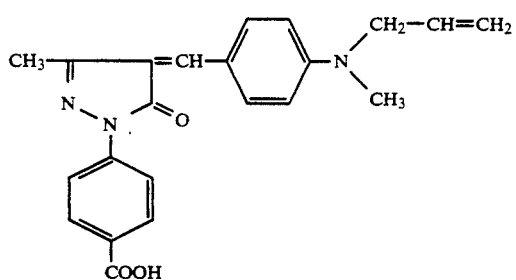
(1)

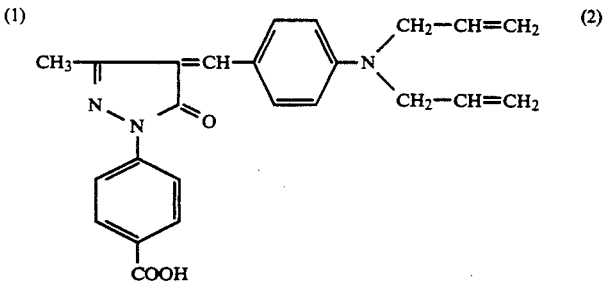
(2)

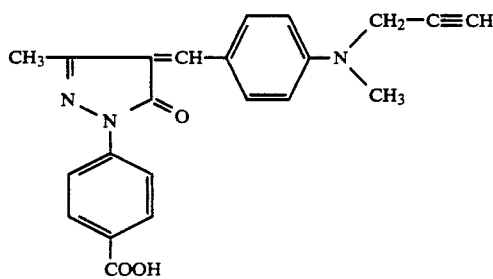
(3)

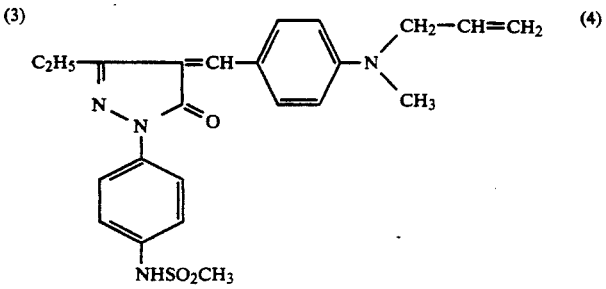
(4)

-continued
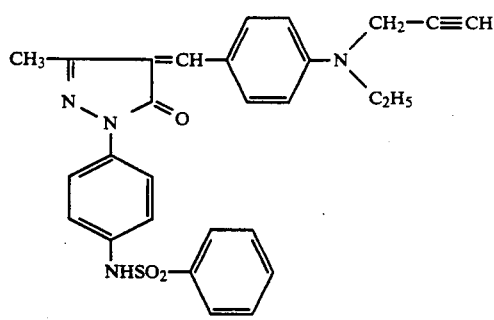 (5)
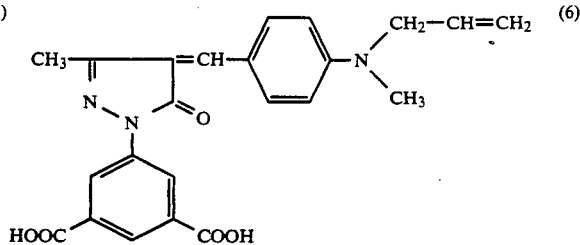 (6)
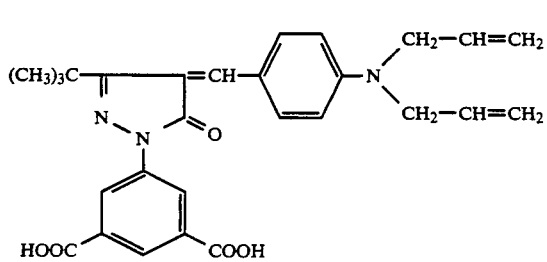 (7)
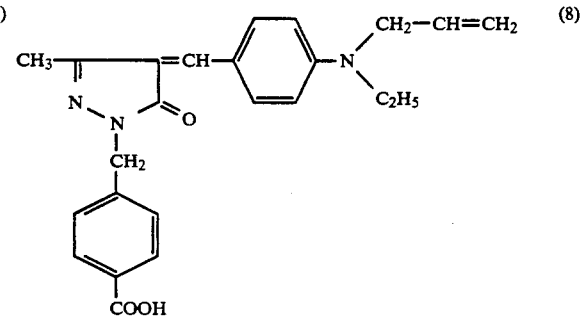 (8)
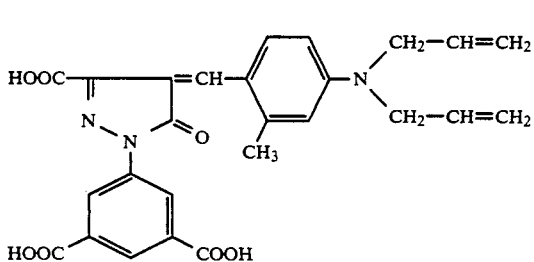 (9)
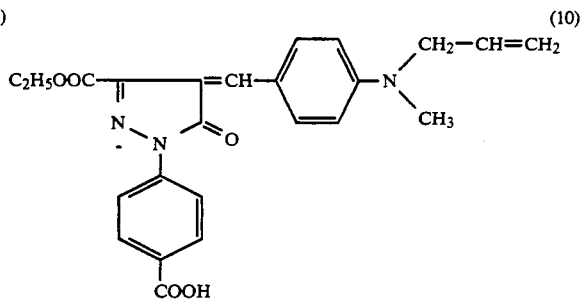 (10)
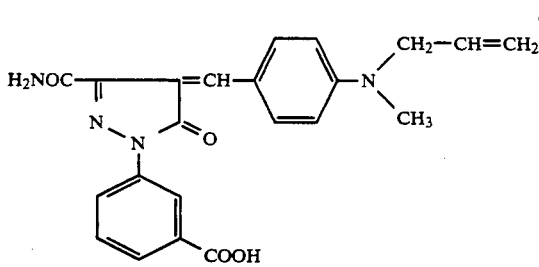 (11)
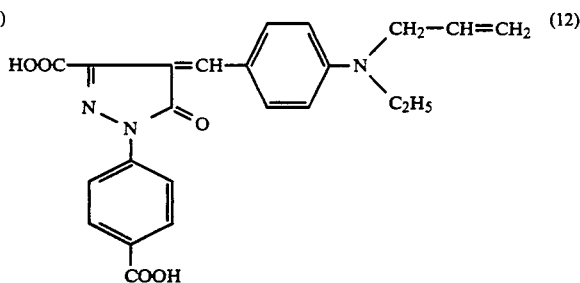 (12)
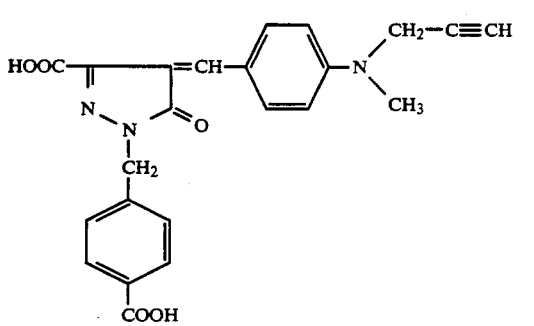 (13)
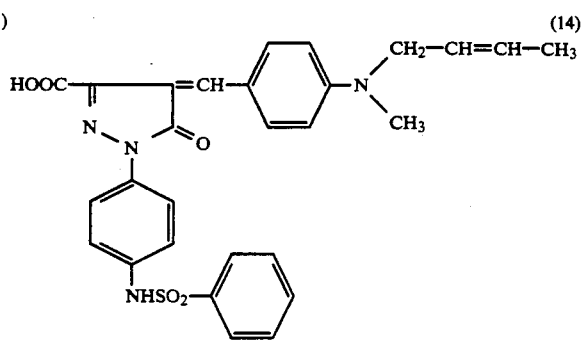 (14)

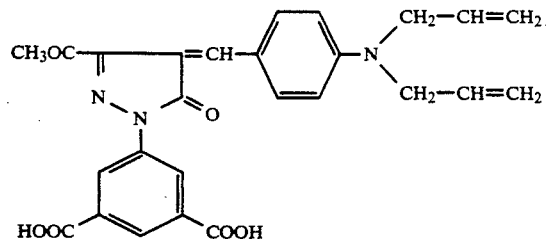 (15)
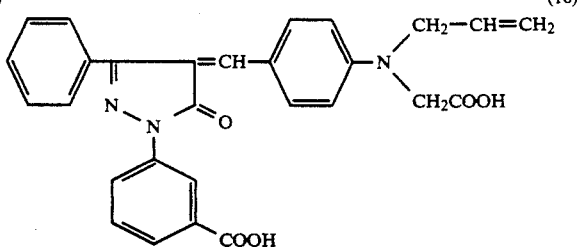 (16)
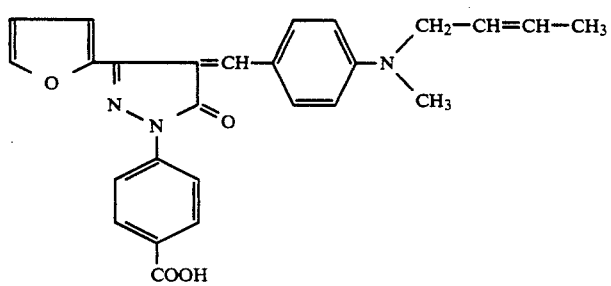 (17)
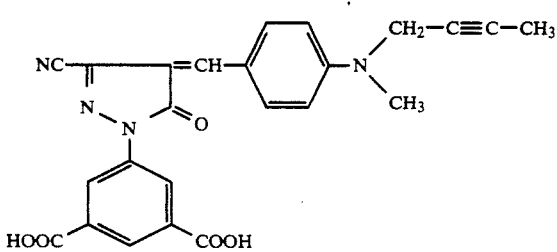 (18)
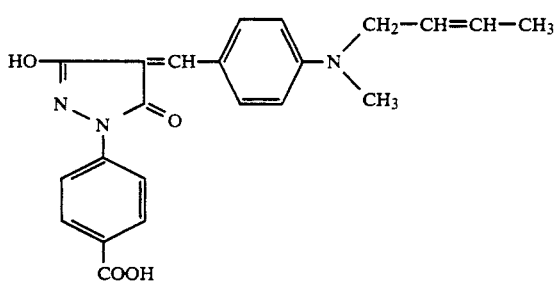 (19)
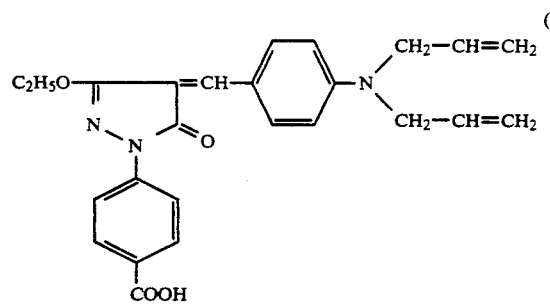 (20)
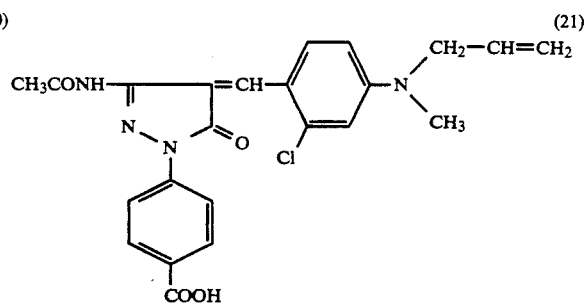 (21)
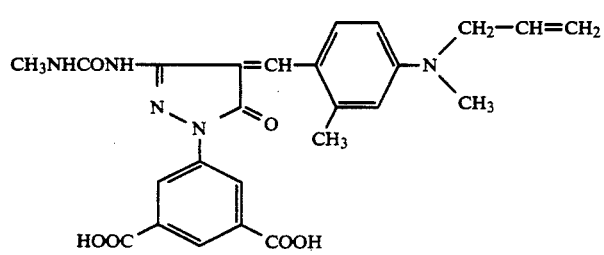 (22)

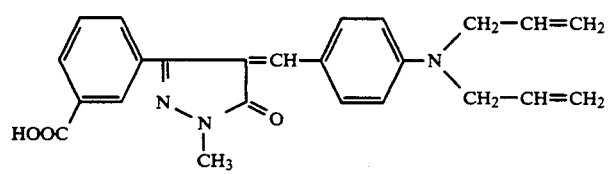 (23)
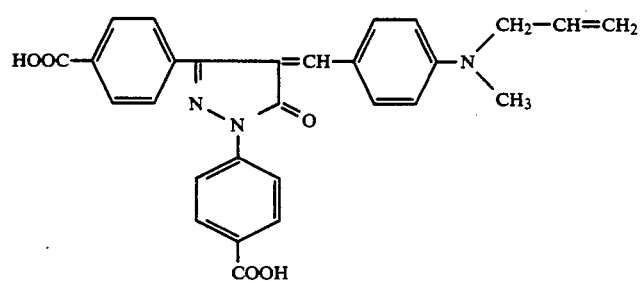 (24)
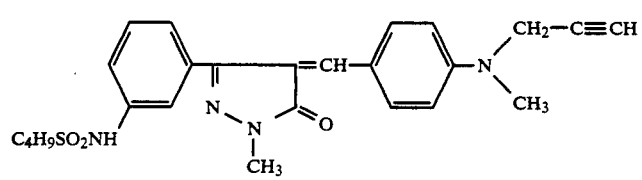 (25)
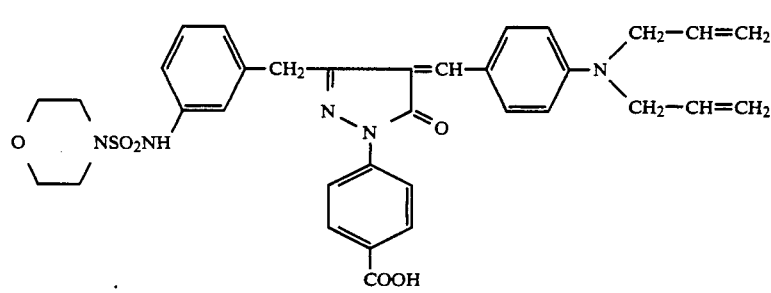 (26)
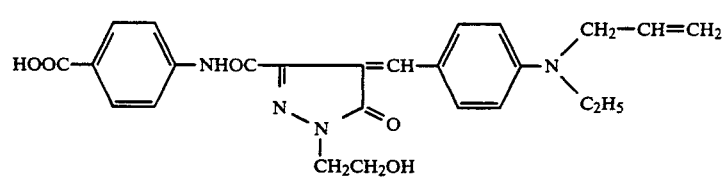 (27)
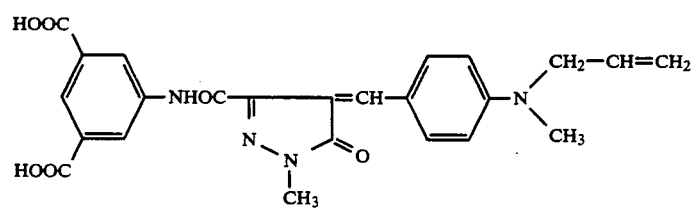 (28)
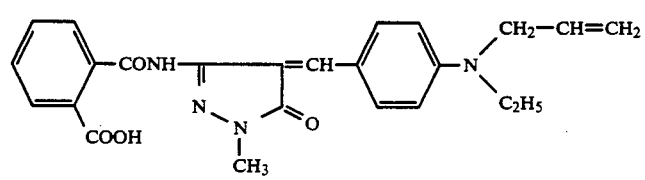 (29)

-continued
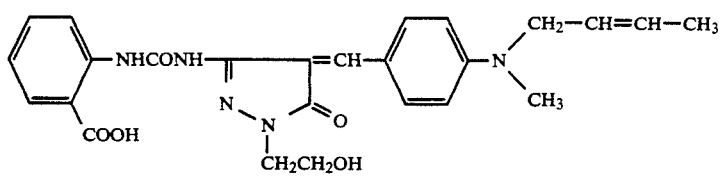 (30)
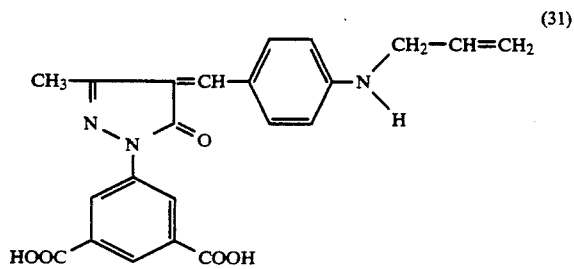 (31)
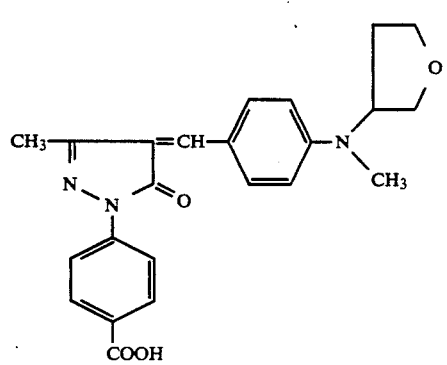 (32)
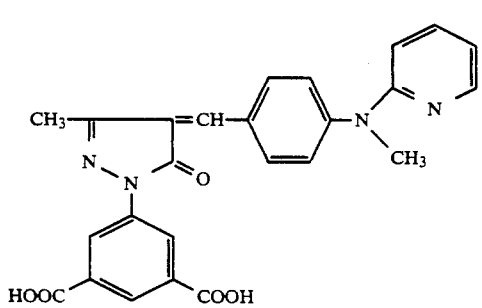 (33)
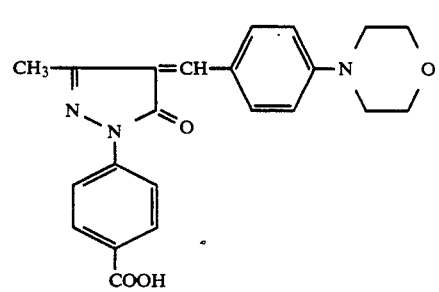 (34)
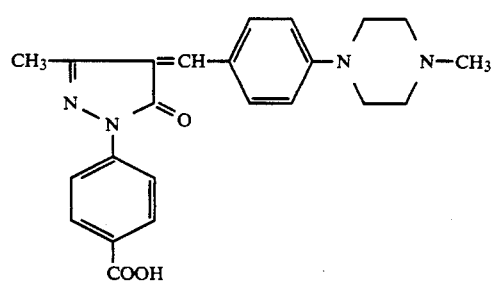 (35)
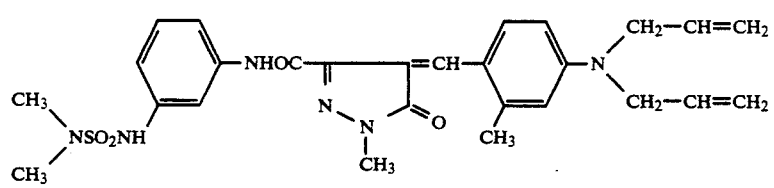 (36)
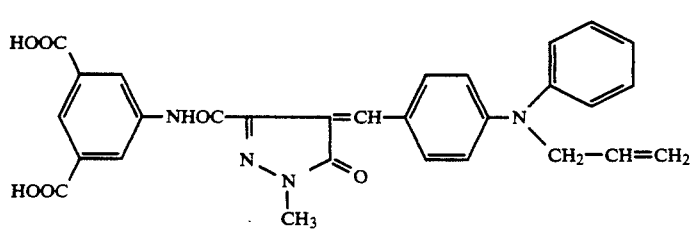 (37)

-continued
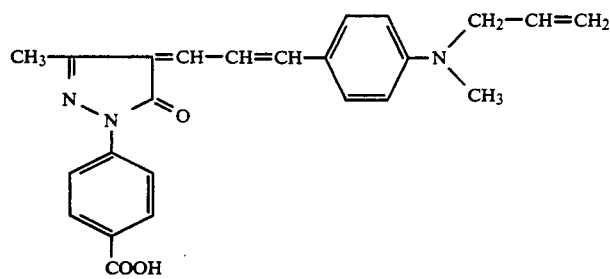 (38)
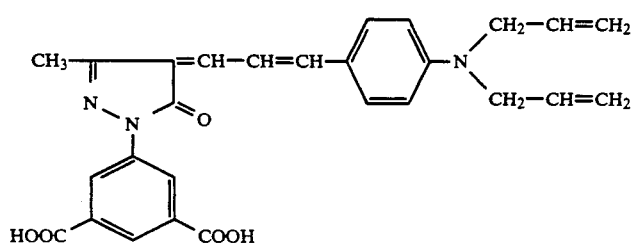 (39)
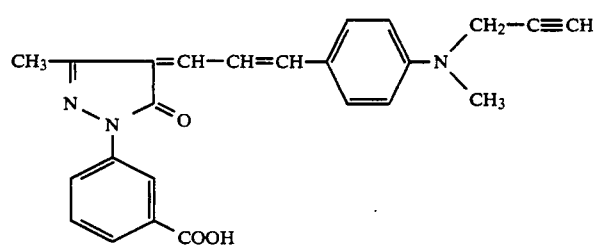 (40)
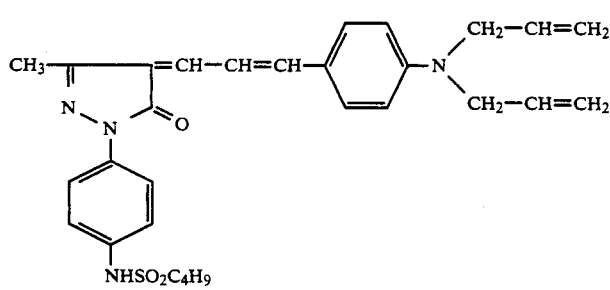 (41)
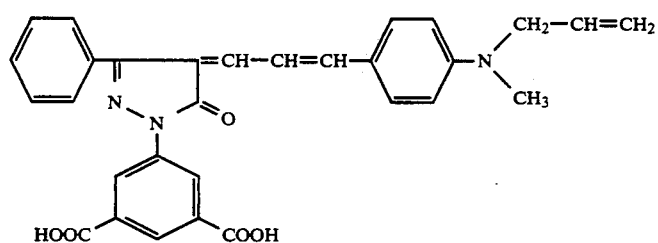 (42)
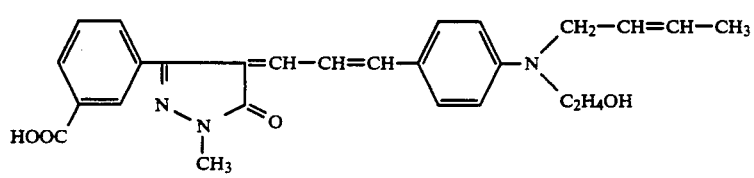 (43)

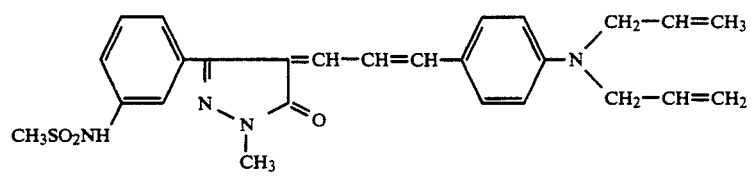
(44)
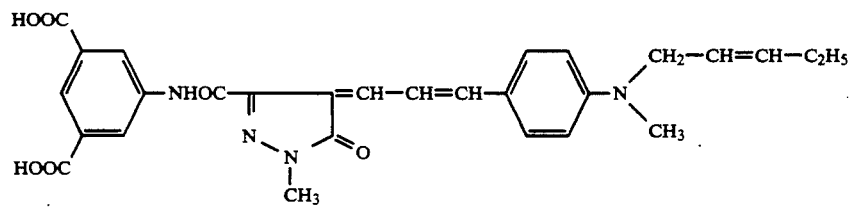
(45)
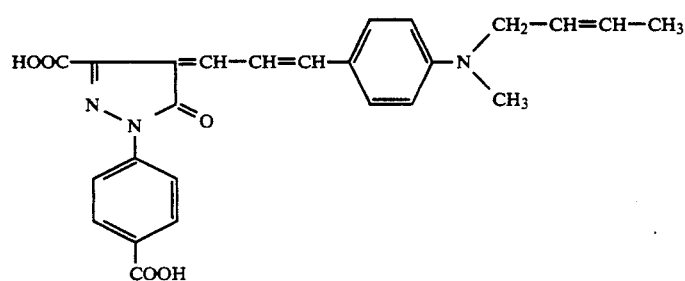
(46)
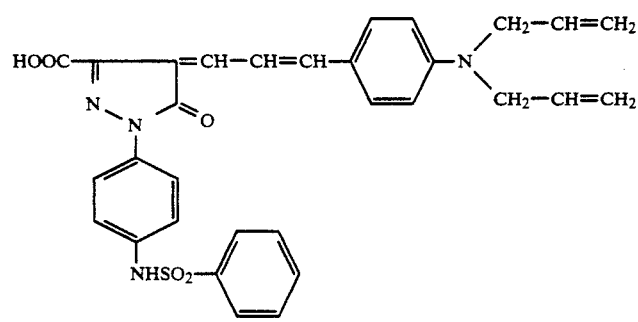
(47)
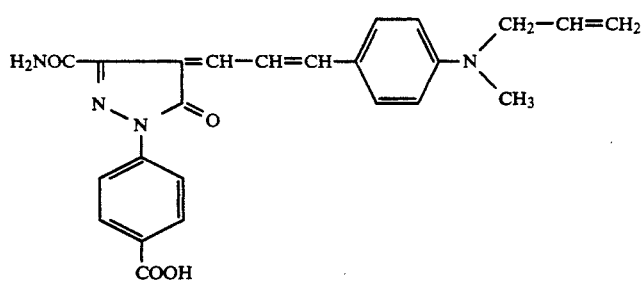
(48)
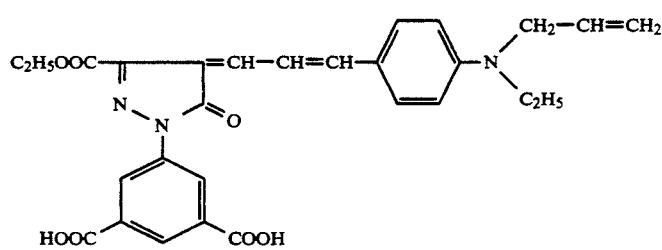
(49)

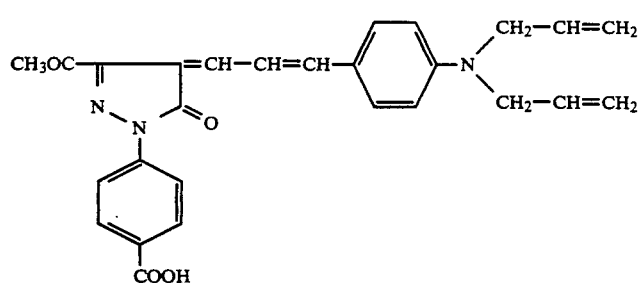
(50)
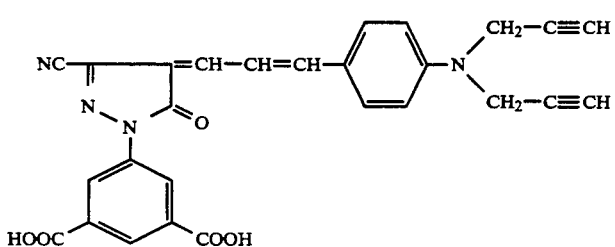
(51)
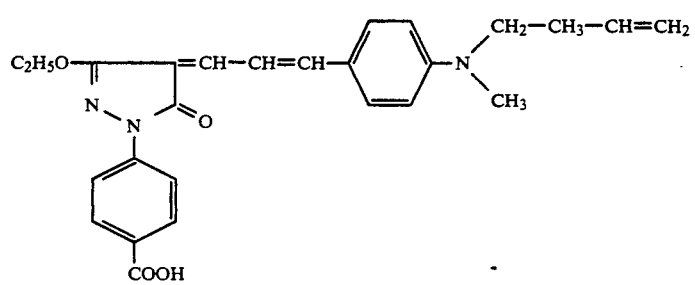
(52)
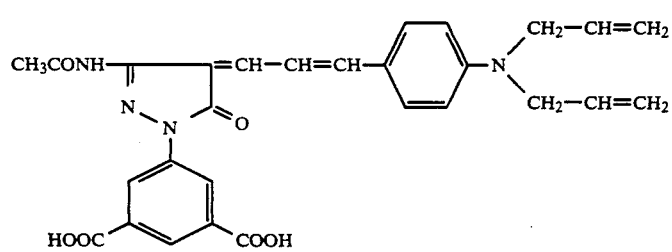
(53)
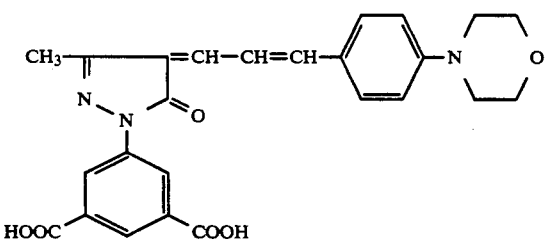
(54)
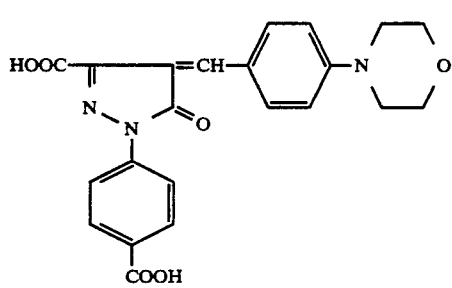
(55)
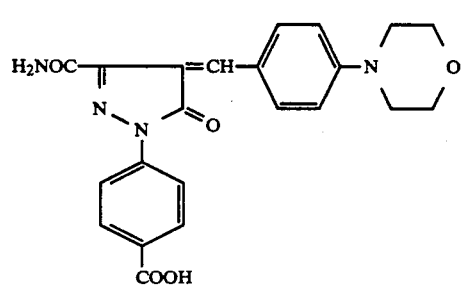
(56)

-continued

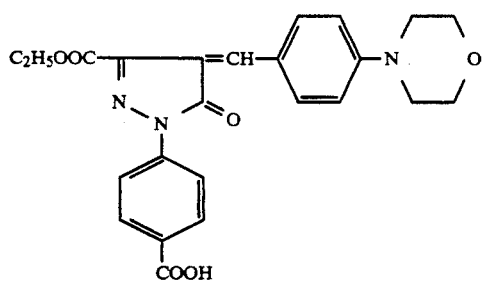 (57)

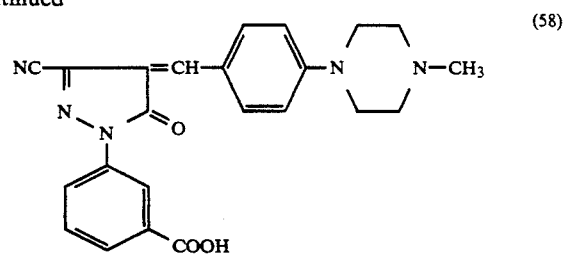 (58)

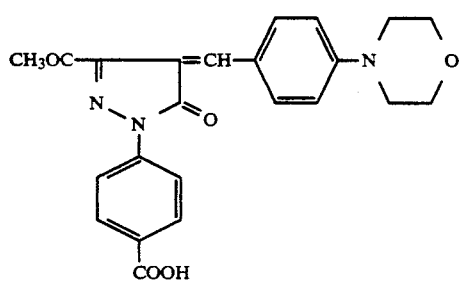 (59)

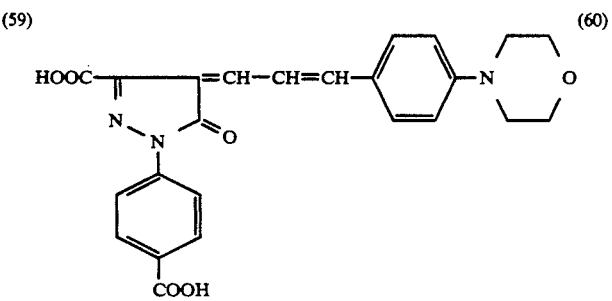 (60)

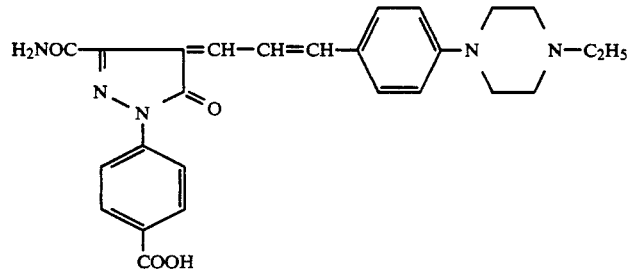 (61)

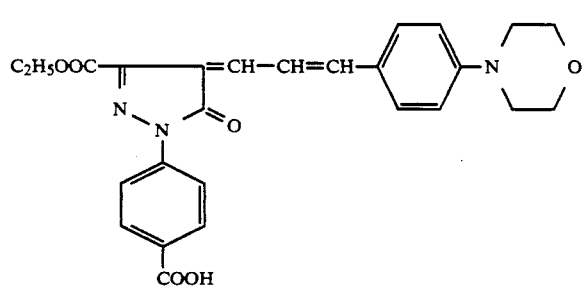 (62)

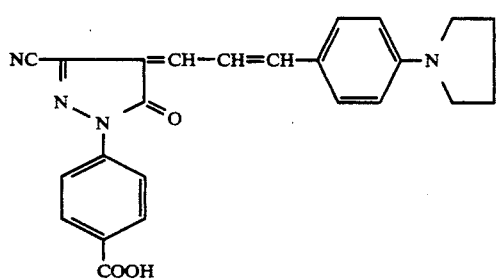 (63)

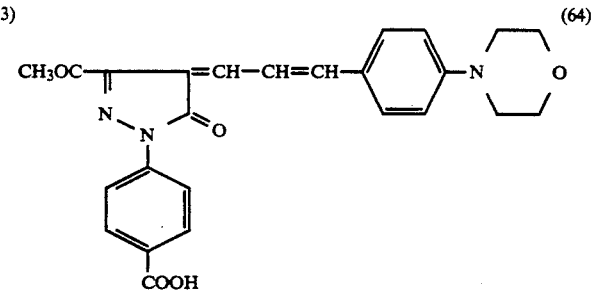 (64)

The typical examples of synthesizing the compounds of the invention will be given below. In the same manner, the other compounds may also readily be synthesized.

Synthesis example 1
—A synthesis of Exemplifiedb Compound 1—

A mixture of 21.8 g of 1-(4-carboxymethylphenyl)-3-methyl-2-pyrazoline-5-one, 20.1 g of 4-diarylaminobenzaldehyde and 300 ml of ethanol was stirred with heating for 3 hours under reflux. After the resulting reacted mixture was kept cooled, the product was fitrated. The filtrated product was formed into a slurry in ethanol under reflux and the slurry was filtrated to take out a dye so as to be refined. The above-mentioned treatments were repeated. Resultingly, 18.0 g of Compound 2 was obtained.

The structure of the resulting compound was confirmed by making use of NMR, IR and MASS spectra.

The compounds of the invention are particularly useful for the dyes for photographic use, and they are contained in the form of the solid fine particle dispersed matter in a light-sensitive silver halide emulsion layer and other non-light-sensitive layers such as a protective layer, an interlayer, a filter layer, and an antihalation layer.

The typical methods of obtaining the solid fine particle dispersed matter capable of serving as the compounds of the invention include, for example, the deposition methods and the mechanical pulverization methods such as described below:

1. Deposition methods: One method in which, when a subject compound is a base-soluble solid fine particle dispersed matter, the compound is dissolved in basic water and is then added to an acidic solution so as to be dispersed therein; another method in which, when a subject compound is an organic solvent-soluble solid fine particle dispersed matter, the compound is dissolved in a water-miscible organic solvent and is then added into water so as to be dispersed therein; and a further method in which a subject compound is dissolved in a water-nonmiscible low boiling organic solvent to form into an oil drops-in-water type dispersed matter and the solvent is then removed.

2. Mechanical pulverization methods: One method in which a subject compound is pulverized to be fine powder by making use of a high energy such as ultrasonic waves and the resulting fine powder is then added into a hydrophilic colloidal solution so as to be dispersed therein; and another method in which a subject compound is wetted in water or an oligosolvent in the presence of a dispersion aid and is then dispersed therein to be in the fine particle form by making use of a mill.

In the invention, the solid fine particle dispersed matters of the compounds of the invention are desirable to be narrow in the distribution thereof.

In the invention, the desirable methods for obtaining the solid fine particle dispersed matters having a narrow distribution include, for example, (1). the deposition methods such as (i) a method in which a subject compound is dissolved in a basic hydrophilic colloidal solution containing a dispersion aid and an acid is gradually added thereinto so as to obtain a dispersed matter; (ii) a method in which a subject compound is dissolved in an aqueous basic solution and the resulting solution is gradually added into a neutral or acidic hydrophilic colloidal solution containing a dispersion aid so as to obtain a dispersed matter; (iii) a uniform precipitation method in which crystals are graduallu precipitated from a uniform solution invented by H. H. Willard and L. Gordon; (iv) a method in which a subject compound is dissolved in a water-miscible organic solvent and the resulting solution is added into a hydrophilic colloidal solution containing a dispersion aid so as to be dispersed therein; (v) a method in which a subject compound is dissolved in a water-miscible organic solvent containing a dispersion aid and the resulting solution is added into a hydrophilic colloidal solution so as to be dispersed therein; and (vi) a method in which a subject compound is dissolved in a water-nonmiscible organic solvent and the resulting solution is mixed with a hydrophilic colloidal solution so as to make a water drops-in oil type dispersed matter and, then, an oil drops-in-water type dispersed matter is prepared in the so-called phase inversion method, so that the water-nonmiscible organic solvent may be volatilizably removed; and (2) the mechanical pulverization methods such as (vii) a method in which a subject compound is wetted in water or an oligosolvent and it is dispersed into the fine particle form by making use of a mill utilized with a medium having a narrow particle distribution in the presence of a dispersion aid and/or a hydrophilic colloid.

The above-mentioned water-miscible organic solvents shall not be limited, provided that a reagent for photographic use can be dissolved without any decomposition thereof and can also be miscible with water. The typical examples thereof include; alcohols such as methyl alcohol, ethyl alcohol, n-propyl alcoho, isopropyl alcohol, diacetone alcohol, and ethylene glycol monobutyl alcohol; glycols such as ethylene glycol, diethylene glycol, and propylene glycol; cyclic ethers such as dioxane and tetrahydrofuran; nitriles such as acetonitrile; amides such as dimethylformamide; amides such as dimethylformamide and, besides the above, N-methyl-2-pyrolidone. Among them, n-propyl alcohol is preferably used from the viewpoint of the dispersion stability.

In the invention, the particularly preferable method for obtaining a solid fine particle dispersed matter having a narrow distribution include, for example, a method in which a subject compound is wetted in water or an oligosolvent and is dispersed into the fine particle form at a high temperature in the presence of a dispersion aid and/or a hydrophilic colloid by making use of a mill —a pulverizer— utilized therein with a medium —a pulverizaton medium— having a narrow particle distribution.

In the invention, the apparatuses for embodying a solid fine particle dispersion include, for example, a ball-mill, a roll-mill and a sand mill. Among the apparatuses, the sand mill is preferably used. Any of the sand mills available on the market can widely be utilized.

In the invention, when making use of a sand mill to disperse the solid fine particles of the compound of the invention, a solid fine particle dispersed matter having a narrow distribution can be obtained by making use of a medium having a narrow particle size distribution.

The particle size distribution of such a medium is desirably not more than 30%, preferably not more than 25% and particularly not more than 20%, in the range of the distribution defined as follows.

<Definition of the distribution range>

Standard particle size deviation × 100/average particle size=distribution rage (%)

When solid fine particles are dispersed at a high temperature by making use of the above-mentioned medium having a narrow distribution, a solid fine particle dispersed matter having a further narrower distribution can be obtained. The dispersion is to be made at a temperature of normally not lower than 30° C., desirably not lower than 40° C. and preferably within the range of not lower than 50° C. to not higher than 80° C. It is not desirable to make the dispersion at a temperature of not lower then 80° C., because a cohesive matter is produced or the compound used is changed in quality.

In the invention, the solid fine particle dispersed matters have an average particle size of, normally, not larger than 1 $\mu$m, desirably, within the range of not larger than 0.7 $\mu$m to not smaller than 0.005 $\mu$m and, preferably, within the range of not larger than 0.4 $\mu$m to not smaller than 0.01 $\mu$m.

The term, a particle size, stated herein means a diameter obtained when a projective particle image area is converted into the same circular image area.

In the invention, the dispersion aids for preparing the solid fine particle dispersed matters are desirably of the anionic, nonionic and betain types and can be used together with any known surfactants.

The surfactants applicable to be served as the dispersants for the compounds of the invention may be used in an amount within the range of 0.1 to 15 wt % of the amounts of the compounds.

In the invention, when preparing the solid fine particle dispersed matters of the compounds of the invention, a hydrophilic colloid is desirably used and, besides, gelatin, a gelatin derivative, albumin, casein, gum arabic, poly-N-vinylpyrolidone, hydroxymethyl cellulose, polyacrylamide and polyacrylic acid may also be used.

In the invention, in the solid fine particle dispersed matters or the hydrophilic colloidal solutions, a small amounts of acids including, particularly, organic acids such as acetic acid, citric acid, oxalic acid and tartaric acid may be used and, it is desired that the dispersed matters or the colloidal solutions are adjusted to be neutral or acidic.

In the invention, the compounds of the invention are desirably not substantially soluble against neutral or acidic water —having a pH of not higher than 7—, but soluble in basic water —having a pH of not lower than 9—, that is, soluble in most of photographic processing solutions. The expression, not substantially soluble, stated herein means that the solubility to distilled water at a temperature of 25° C. is not higher than 1 wt %, desirably not higher than 0.5 wt % and preferably not higher than 0.2 wt %.

In the invention, the amounts of the solid fine particle dispersed matters of the compounds of the invention may be added variously so as to meet the purposes. There is not any special limitation to the amounts thereof to be added, but they may be added in an amount within the range of, normally, 0.0001 g/m$^2$ to 5.0 g/m$^2$, desirably, 0.005 g/m$^2$ to 1.0 g/m$^2$ and, preferably, 0.001 g/m$^2$ to 0.5 g/m$^2$.

In the light-sensitive materials of the invention, it is allowed to use two or more kinds of the solid fine particle dispersed matters of the compounds of the invention in combination and, if required, it is also allowed to use the dispersed matters of other hydrophobic dyes or a water-soluble dyes in combination.

In the invention, the solid fine particle dispersed matters of the compounds of the invention are stably present in a silver halide light-sensitive material, because the dispersed matters are water-insoluble. However, the dispersed matters are made water-soluble by processing them with a photographic developer —having a pH of not lower than 9— so that they are made effluent upon dissolution, and/or the dispersed matters are mostly eliminated from the above-mentioned silver halide light-sensitive material by a chemical decoloration reaction.

In the invention, when narrowing the distribution of the solid fine particle dispersed matters of the compounds of the invention, the rates of the above-mentioned dissolution effluence and/or chemical decoloration reaction are made faster and a remaining amount thereof is reduced, so that the sharpness improvement effects can further effectively be displayed while minimizing the lowering of sensitivity, because the color contamination of a silver halide light-sensitive material can effectively be prevented and the light scattering can also be inhibited from producing when exposing the silver halide light-sensitive material to light.

There is no special limitation to the methods for containing the solid fine particle dispersed matter of the compound of the invention in a light-sensitive material. The methods therefor include, for example, those described in U.S. Pat. No. 4,857,446.

The compounds of the invention may be contained in either the light-sensitive or non-light-sensitive layers such as a blue-sensitive, green-sensitive or a red-sensitive emulsion layer and an intermediate, protective, filter, antihalation or antiirradiation layer.

The compounds of the invention are contained, preferably, in a non-light-sensitive layer and, particularly, in a filter layer.

To the light-sensitive materials of the invention, any of the ordinary types of silver halide emulsions may be used. Such an emulsion may be chemically sensitized in an ordinary method, and they may also be optically sensitized to a desired wavelength by making use of a sensitizing dye. The silver halide emulsions are further allowed to contain an antifoggant and a stabilizer. As for the binders for the emulsions, gelatin may advantageously be used.

The emulsion layers and the other hydrophilic colloidal layers may be hardened and they are also allowed to contain a plasticizer and a water-insoluble or hardly soluble synthetic polymer dispersed matter —that is so-called a latex—.

To the emulsion layers of a color photographic light-sensitive material, couplers are to be used and, besides, a colored coupler having a color compensation effect, a competing coupler and the compounds capable of releasing the photographically useful fragments upon coupling reaction with the oxidized products of a developing agent, such as a development accelerator, a bleach accelerator, a developing agent, a silver halide solvent, a color toner, a layer hardener, a foggant, an antifoggant, a chemical sensitizer, a spectral sensitizer and a sensitizer.

The light-sensitive materials are allowed to be provided with the auxiliary layers such as a filter layer, an antihalation layer and an antiirradiation layer. The above-mentioned auxiliary layers and/or the emulsion layers are allowed to contain a dye which may be made effluent from the light-sensitive material in the course of a development process or may be bleached.

The light-sensitive materials may be added with a formalin scavenger, a fluorescent whitening agent, a matting agent, a lubricant, an image stabilizer, a surfactant, a color staining inhibitor, a development accelerator, a development retarder, and a bleach accelerator.

As for the supports for the light-sensitive materials, a sheet of paper laminated thereon with polyethylene or the like, a polyethyleneterephthalate film, a sheet of baryta paper, and a cellulose triacetate film may be used.

An image can be obtained on a light-sensitive material of the invention when the light-sensitive material is exposed to light and is then treated in the known photographic process.

EXAMPLES

Example-1

In every example given below, the amounts of the materials added into a silver halide photographic light-sensitive material shall be indicated by weight —in gram— per sq.meter —m²— unless other wise expressly stated; and the amounts of silver halides and colloidal silver shall be converted into the amounts of the silver contained therein.

On a triacetyl cellulose film support, each of the layers having the following compositions was formed in order from the support side, so that a multilayered color photographic element, Sample 1-1, was prepared.

| Sample 1-1 - for comparison | |
|---|---|
| Layer 1: An antihalation layer, HC-1 | |
| Black colloidal silver | 0.20 |
| UV absorbent, UV-1 | 0.20 |
| Colored couplers, CC-1 | 0.05 |
| Colored coupler, CM-2 | 0.05 |
| High boiling solvent, Oil-1 | 0.20 |
| Gelatin | 1.5 |
| Layer 2: An intermediate layer, IL-1 | |
| UV absorbent, UV-1 | 0.01 |
| High boiling solvent, Oil-1 | 0.01 |
| Gelatin | 1.5 |
| Layer 3: A low speed red sensitive emulsion layer, RL | |
| Silver iodobromide emulsion, Em-1 | 0.8 |
| Silver iodobromide emulsion, Em-2 | 0.8 |
| Sensitizing dye, S-1, | $2.5 \times 10^{-4}$ mols/mol of Ag |
| Sensitizing dye, S-2 | $2.5 \times 10^{-4}$ mols/mol of Ag |
| Sensitizing dye, S-3 | $0.5 \times 10^{-4}$ mols/mol of Ag |
| Cyan coupler, C-1 | 0.5 |
| Cyan coupler, C-2 | 0.05 |
| Cyan coupler, C-4 | 0.5 |
| Colored cyan coupler, CC-1 | 0.05 |
| DIR compound, D-1 | 0.002 |
| High boiling solvent, Oil-1 | 0.5 |
| Gelatin | 1.5 |
| Layer 4: A high speed red sensitive emulsion layer, RH | |
| Silver iodobromide emulsion, Em-3 | 2.0 |
| Sensitizing dye, S-1 | $2.0 \times 10^{-4}$ mols/mol of Ag |
| Sensitizing dye, S-2 | $2.0 \times 10^{-4}$ mols/mol of Ag |
| Sensitizing dye, S-3 | $0.1 \times 10^{-4}$ mols/mol of Ag |
| Cyan coupler, C-2 | 0.015 |
| Cyan coupler, C-3 | 0.10 |
| Cyan coupler, C-4 | 0.25 |
| Colored cyan coupler, CC-1 | 0.015 |
| DIR compound, D-2 | 0.05 |
| High boiling solvent, Oil-1 | 0.2 |
| Gelatin | 1.5 |
| Layer 5: an intermediate layer, IL-2 | |
| Gelatin | 0.5 |
| Layer 6: A low speed green sensitive emulsion layer, GL | |
| Silver iodobromide emulsion, Em-1 | 1.0 |
| Sensitizing dye, S-4 | $5 \times 10^{-4}$ mols/mol of Ag |
| Sensitizing dye, S-5 | $1 \times 10^{-4}$ mols/mol of Ag |
| Magenta coupler, M-1 | 0.5 |
| Colored magenta coupler, CM-1 | 0.01 |
| DIR compound, D-3 | 0.02 |
| DIR compound, D-4 | 0.020 |
| High boiling solvent, Oil-2 | 0.3 |
| Gelatin | 1.0 |
| Layer 7: An intermediate layer, IL-3 | |
| Gelatin | 0.8 |
| Layer 8: A high speed green sensitive emulsion layer, GH | |
| Silver iodobromide emulsion, Em-3 | 1.3 |
| Sensitizing dye, S-6 | $1.5 \times 10^{-4}$ mols/mol of Ag |
| Sensitizing dye, S-7 | $2.5 \times 10^{-4}$ mols/mol of Ag |

| -continued | |
|---|---|
| Sample 1-1 - for comparison | |
| Sensitizing dye, S-8 | $0.5 \times 10^{-4}$ mols/mol of Ag |
| Magenta coupler, M-2 | 0.05 |
| Magenta coupler, M-3 | 0.15 |
| Colored magenta coupler, CM-2 | 0.05 |
| DIR compound, D-3 | 0.01 |
| High boiling solvent, Oil-3 | 0.5 |
| Gelatin | 1.0 |
| Layer 9: A yellow filter layer, YC | |
| Yellow colloidal silver | 0.1 |
| Color-staining inhibitor, SC-1 | 0.1 |
| High boiling solvent, Oil-3 | 0.1 |
| Gelatin | 0.8 |
| Layer 10: A low speed blue sensitive emulsion layer, BL | |
| Silver iodobromide emulsion, Em-1 | 0.25 |
| Silver iodobromide emulsion, Em-2 | 0.25 |
| Sensitizing dye, S-10 | $7 \times 10^{-4}$ mols/mol of Ag |
| Yellow coupler, Y-1 | 0.5 |
| Yellow coupler, Y-2 | 0.1 |
| DIR compound, D-2 | 0.01 |
| High boiling solvent, Oil-3 | 0.3 |
| Gelatin | 1.0 |
| Layer 11: A high speed blue sensitive emulsion layer, BH | |
| Silver iodobromide emulsion, Em-4 | 0.50 |
| Silver iodobromide emulsion, Em-1 | 0.20 |
| Sensitizing dye, S-9 | $1 \times 10^{-4}$ mols/mol of Ag |
| Sensitizing dye, S-10 | $3 \times 10^{-4}$ mols/mol of Ag |
| Yellow coupler, Y-1 | 0.30 |
| Yellow coupler, Y-2 | 0.05 |
| High boiling solvent, Oil-3 | 0.15 |
| Gelatin | 1.1 |
| Layer 12: The first protective layer, PRO-1 | |
| Finely grained silver iodobromide emulsion, having an average grain size of 0.08μ and an AgI content of 2 mol % | 0.4 |
| UV absorbent, UV-1 | 0.10 |
| UV absorbent, UV-2 | 0.05 |
| High boiling solvent, Oil-1 | 0.1 |
| High boiling solvent, Oil-4 | 0.1 |
| Formalin scavenger, HS-1 | 0.5 |
| Formalin scavenger, HS-2 | 0.2 |
| Gelatin | 1.0 |
| Layer 13: The second protective layer, PRO-2 | |
| Surfactant, Su-1 | 0.005 |
| Alkali-soluble matting agent having an average particle size of 2 μm | 0.05 |
| Polymethyl methacrylate having an average particle size of 3 μm | 0.05 |
| Cyan dye, AIC-1 | 0.005 |
| Magenta dye, AIM-1 | 0.01 |
| Lubricant, WAX-1 | 0.04 |
| Gelatin | 0.6 |

Besides the above-given compositions, coating aid Su-2, Dispersing aid Su-3, layer hardener H-1 —in an amount of 40 mg/g of gelatin—, stabilizer Stab-1, and antifoggant AF-1 were added into each of the layers.

Em-1 : A monodispersive emulsion having a low silver iodide content in the surface, of which the average grain size was 0.46 μm and the average silver iodide content was 7.0%;

Em-2 : A monodispersive emulsion having a unifor composition, of which the average grain size was 0.30 μm and the average silver iodide content was 2.0%;

Em-3 : A monodispersive emulsion having a low silver iodide content in the furface, of which the average grain size was 0.81 μm and the average silver iodide content was 7.0%; and Em-4 : A monodispersive emulsion having a low silver iodide content in the surface, of which the average grain size 0.95 μm and the average silver iodide content was 8.0%.
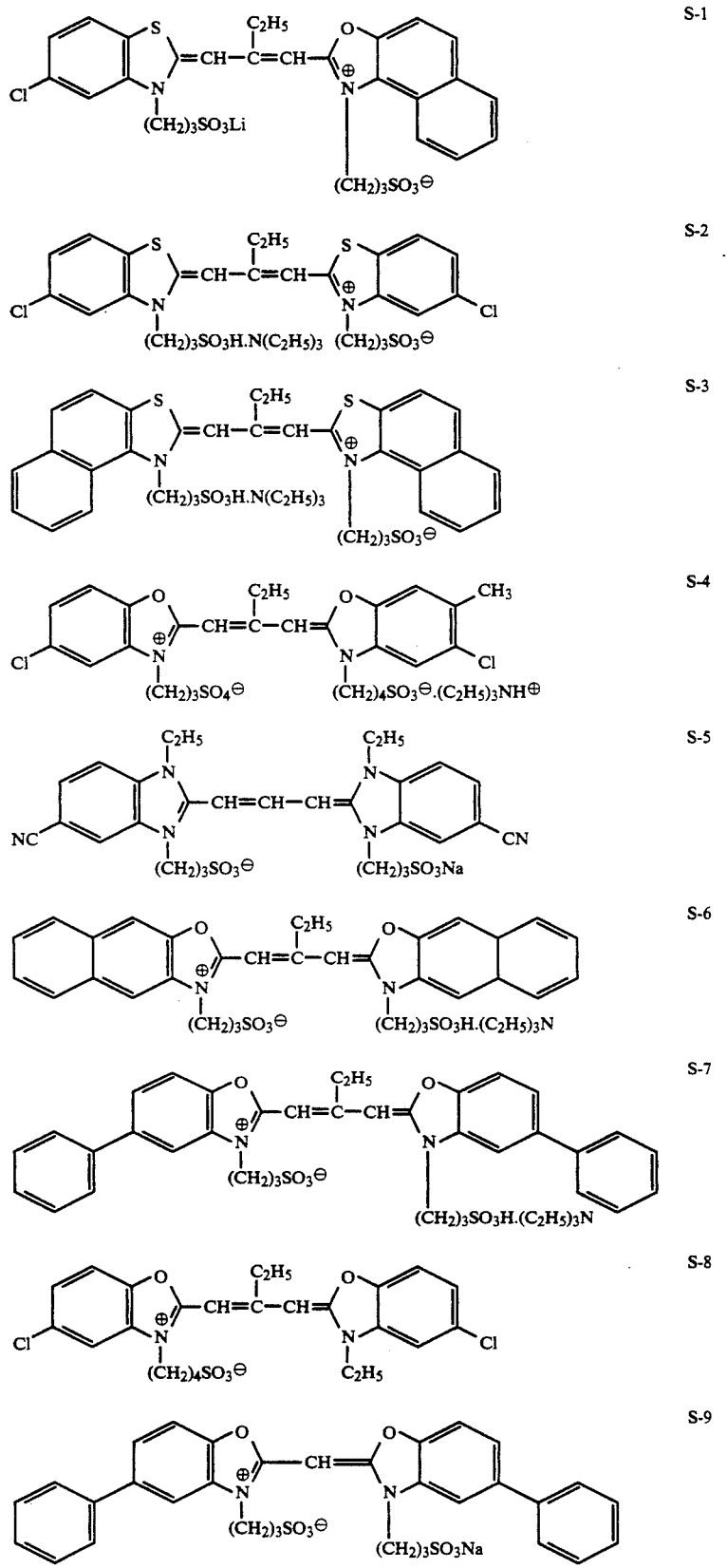

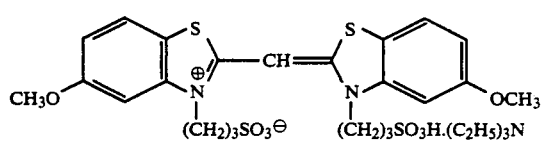
S-10
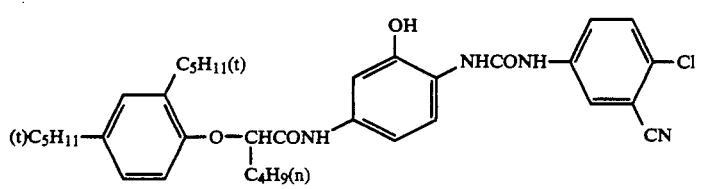
C-1
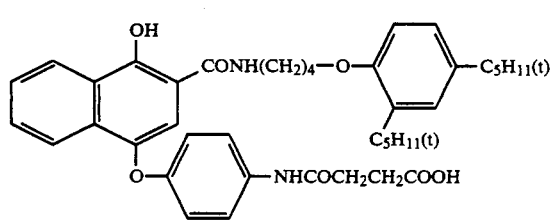
C-2
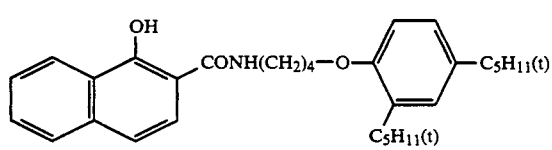
C-3
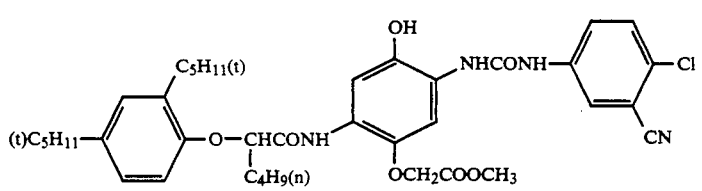
C-4
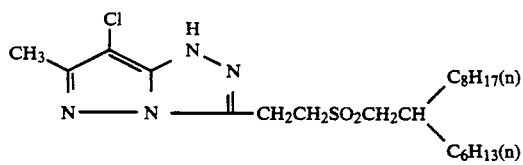
M-1
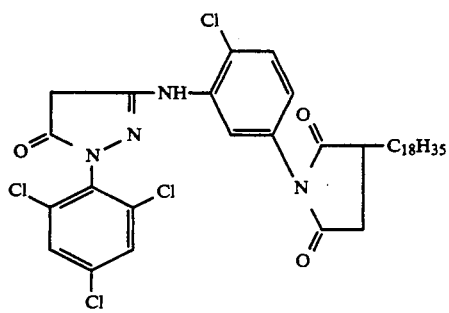
M-2

M-3
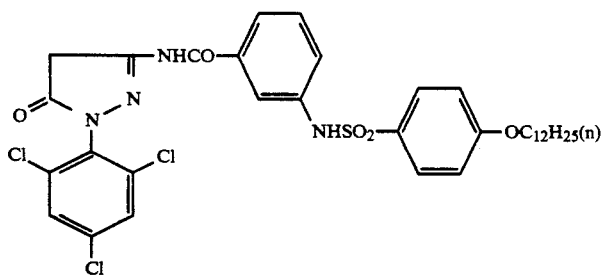
Y-1
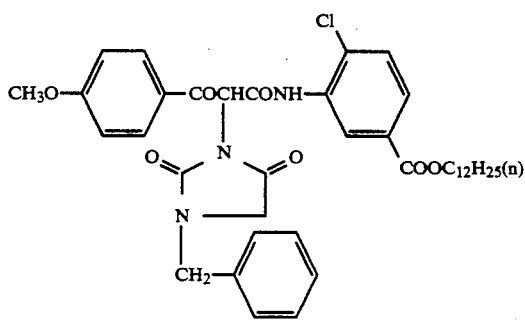
Y-2
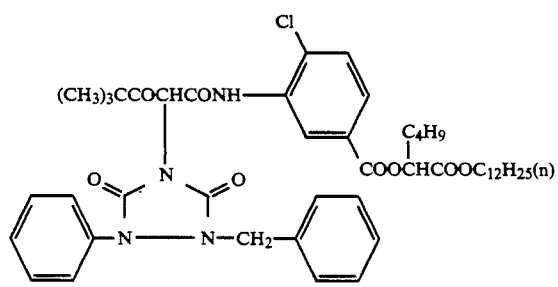
CC-1
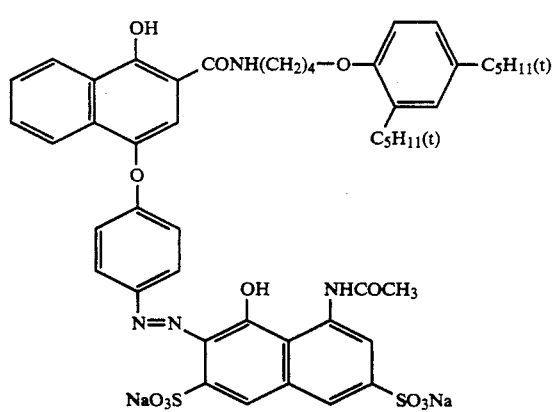
CM-1
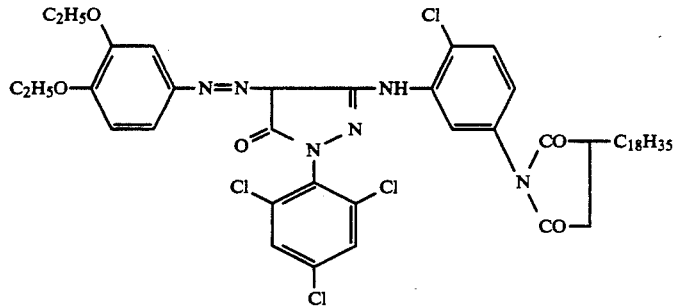

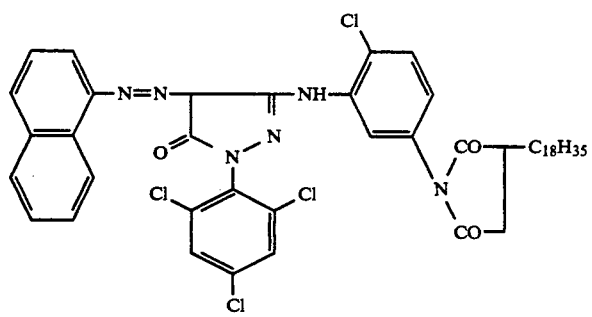
CM-2
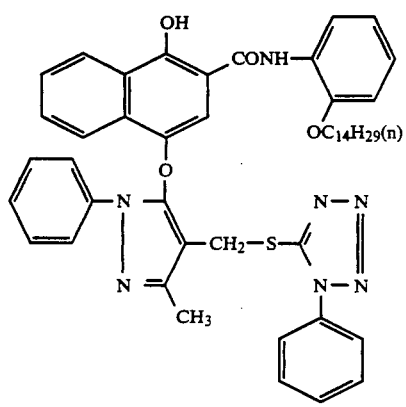
D-1
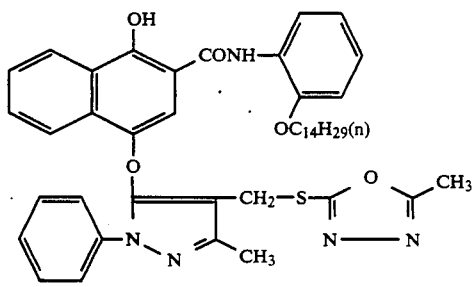
D-2
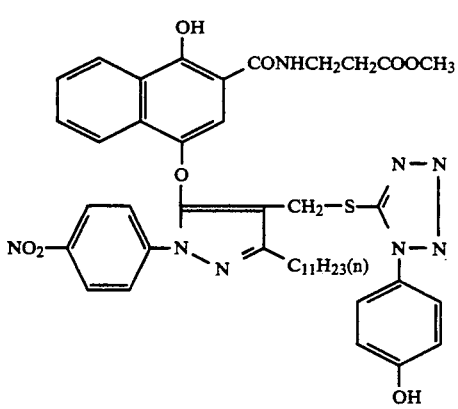
D-3

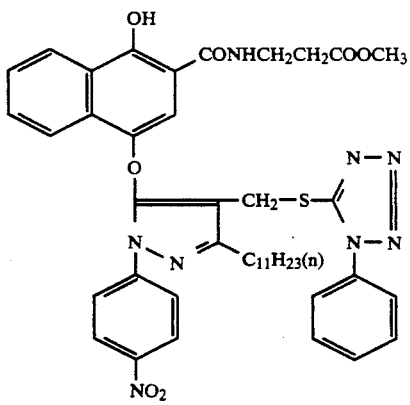 D-4
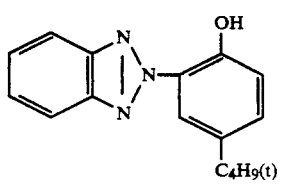 UV-1
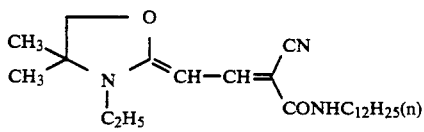 UV-2
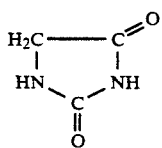 HS-1
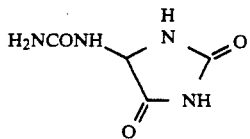 HS-2
$CH_2=CHSO_2CH_2OCH_2SO_2CH=CH_2$  H-1
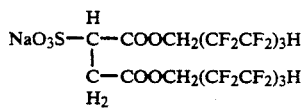 Su-1
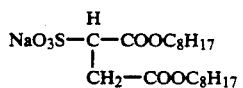 Su-2
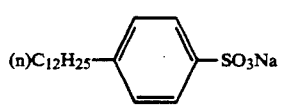 Su-3
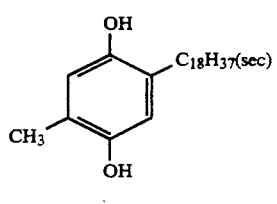 SC-1

-continued
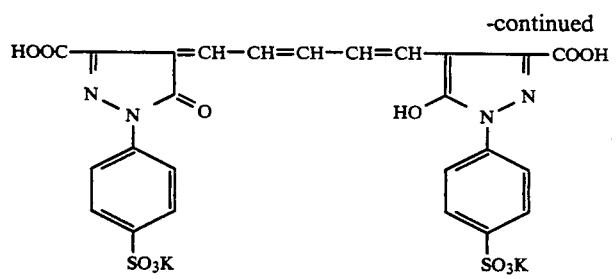 AIC-1
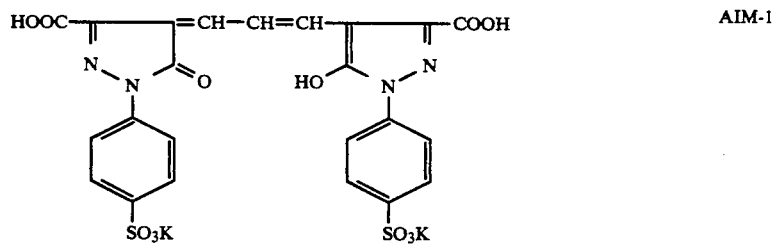 AIM-1
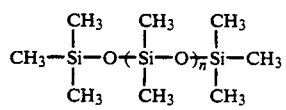 WAX-1
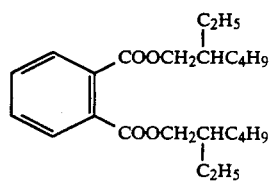 oil-1
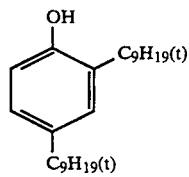 oil-2
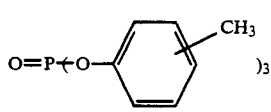 oil-3
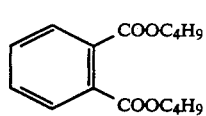 oil-4
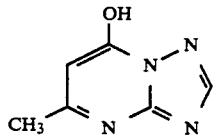 Stab-1
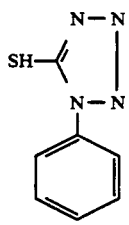 AF-1

Preparation of Samples 1 and 2

A multilayered color photographic element, Sample 1-2, was prepared in the same manner as in Sample 1-1, except that the dye shown in Table-1 was dissolved, in place of the yellow colloidal silver contained in Layer 9, into ethyl acetate together with high boiling solvent Oil-3, color-staining inhibitor SC-1 and surfactant Alkanol XC —alkylnaphthalene sulfonate, manufactured by DuPont—, and was then dispersed with gelatin, so that the resulting dispersed solution was coated.

Preparation of Samples 1-3 through 1-10

With respect to Samples 1-3 through 1-10 each shown in Table-1, the dyes for each sample were dispersed in solid fine particles in the following procedures by making use of a ball mill.

Water and a surfactant, Alkanol XC —alkylnaphthalene sulfonate manufactured by DuPont— were put in the container of the ball mill and the dyes were added thereinto respectively. The beads of zirconium oxide were further put into the container and the container was closed. The contents of the container were dispersed by making use of the ball mill for 4 days.

After then, an aqueous gelatin solution was added thereinto and the mixture was mixed up for 10 minutes and the beads were moved therefrom, so that a coating solution was obtained. Thus, multilayered color photographic elements 1-3 through 1-10 were prepared in the same manner as in Sample 1-1, except that the above-prepared coating solution was used in place of the coating solution used in Layer 9 of Sample 1-1.

In Samples 1-1 through 2-10, the amounts of the dyes added were each set to be in an amount of 0.3 g/m$^2$.

Comparative dye 1

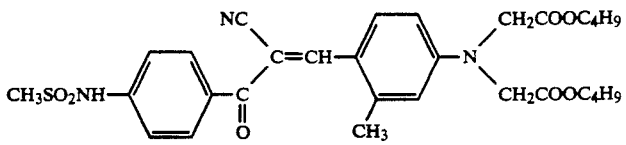

Comparative dye 2

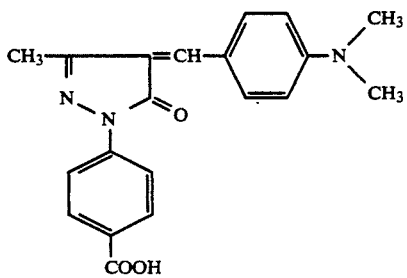

Comparative dye 3

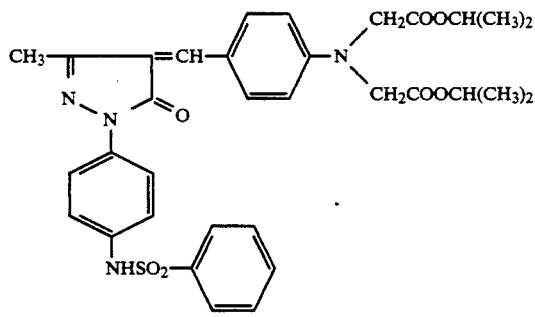

Each of Samples 1-1 through 1-10 thus prepared was exposed wedgewise to white light and subjected to the following developing process.

| Processing step A - made at 38° C. | |
|---|---|
| Color developing | 3 min. 15 sec. |
| Bleaching | 6 min. 30 sec. |
| Washing | 3 min. 15 sec. |
| Fixing | 6 min. 30 sec. |
| Washing | 3 min. 15 sec. |
| Stabilizing | 1 min. 30 sec. |
| Drying | |

In each of the above-mentioned processing steps, the compositions of the processing solutions used were as follows:

| [Color developer] | |
|---|---|
| 4-amino-3-methyl-N-ethyl-N-($\beta$-hydroxyethyl)-aniline.sulfate | 4.75 g |
| Sodium sulfite anhydride | 4.25 g |
| Hydroxylamine.½ sulfate | 2.0 g |
| Potassium carbonate anhydride | 37.5 g |
| Sodium bromide | 1.3 g |
| Trisodium nitrilotriacetate-monohydrate | 2.5 g |
| Potassium hydroxide | 1.0 g |
| Add water to make | 1 liter |
| [Bleacher] | |
| Iron-ammonium ethylenediaminetetraacetate | 100.0 g |
| Diammonium ethylenediaminetetraacetate | 10.0 g |
| Ammonium bromide | 150.0 g |
| Glacial acetic acid | 10.0 ml |

-continued

| | |
|---|---|
| Add water to make | 1 liter |
| Adjust pH with acqous aqueous to be | pH = 6.0 |
| [Fixer] | |
| Ammonium thiosulfate | 175.0 g |
| Sodium sulfite anhydride | 8.5 g |
| Sodium metasulfite | 2.3 g |
| Add water to make | 1 liter |
| Adjust pH with acetic acid to be | pH = 6.0 |
| [Stabilizer] | |
| Formalin, in an aqueous 37% solution | 1.5 ml |
| Konidux, manufactured by Konica Corp. | 7.5 ml |
| Add water to make | 1 liter |

A color developer was prepared by removing 4-amino-3-methyl-N-ethyl-N-($\beta$-hydroxyethyl)-aniline.-sulfate from the foregoing color developer used in the foregoing processing steps. A color development was made by making use of the color veloper prepared and then the bleaching, fixing and stabilizing treatments were carried out in the same manner as in processing step A. —This is named processing step B—

The influence of the dyes on a fog production was evaluated in the following manner:

Influence on fog production $\Delta D_{B2}$ = a difference between a minimum yellow density obtained in processing step A and a minimum yellow density obtained in processing step B, each carried out for Samples 1-1 through 1-10

For evaluating the aging preservability of light-sensitive materials, the light-sensitive materials were forcedly stored for 3 days at a temperature of 55° C. and at a relative humidity of 80% and were then subjected to processing step A, and the deteriorations of the sensitivities of each blue sensitive emulsion layers were compared to each other interms of $\Delta S_B$.

$$\Delta S_B = \frac{\text{Sensitivity of a blue sensitive emulsion layer obtained after aging for 3 days at 55° C. and 80\% RH}}{\text{Sensitivity of the blue sensitive emulsion layer obtained before forced aging}} \times 100(\%)$$

In the above-given equation, the term, a sensitivity of a blue sensitive emulsion layer, is expressed by a reciprocal number of the exposure quantity of (a minimum density + 0.3).

The results obtained are shown in Table-1.

TABLE 1

| Sample No. | Layer 9 | $\Delta D_{B2}$ | $\Delta S_B$ |
|---|---|---|---|
| 1-1 | Yellow colloidal silver | 0.12 | 95% |
| 1-2 | Comparative dye 1 | 0.07 | 78% |
| 1-3 | Comparative dye 2 | 0.08 | 84% |
| 1-4 | Comparative dye 3 | 0.07 | 85% |
| 1-5 | Inventive compound 1 | 0.05 | 94% |
| 1-6 | Inventive compound 2 | 0.06 | 95% |
| 1-7 | Inventive compound 3 | 0.06 | 95% |
| 1-8 | Inventive compound 4 | 0.06 | 93% |
| 1-9 | Inventive compound 6 | 0.05 | 94% |
| 1-10 | Inventive compound 20 | 0.06 | 94% |

As compared to the case where yellow colloidal silver was used as shown in Table-1, the samples of the invention were each proved to be improved on the fog production on the blue sensitive layers. In the comparative sample 1, 2 or 3, i.e., in Samples 1-2 through 1-4, on the other hand, it was proved that the sensitivities of each of the blue sensitive layers were deteriorated in preservation. In the samples each applied with the dyes of the invention, in contrast to the comparative samples, it could be found that the influence on the fog production could be reduced and the preservability could also be excellent.

From each of the samples applied with compounds 36, 37 or 45 in place of compound 1 of the invention, it was also confirmed that the effects of the invention could be displayed.

Example-2

As a comparative sample of the multilayered color photographic light-sensitive materials, Sample 2-1 was further prepared by coating, on a sublayered triacetyl cellulose film support, with each of the layers having the following compositions in order from the support side. The amounts of each of the components are shown in terms of $g/m^2$.

| Sample 2-1 | |
|---|---|
| Layer 1: An antihalation layer | |
| UV absorbent, UV-1 | 0.3 |
| UV absorbent, UV-2 | 0.4 |
| High boiling solvent, Oil-1 | 1.0 |
| Black colloidal silver | 0.24 |
| Gelatin | 2.0 |
| Layer 2: An intermediate layer | |
| 2,5-di-t-octylhydroquinone | 0.1 |
| High boiling solvent, Oil-1 | 0.2 |
| Gelatin | 1.0 |
| Layer 3: A low speed red sensitive silver halide emulsion layer | |
| AgBrI spectrally sensitized with red sensitizing dyes S-2 and S-11, having an AgI content of 4.0 mol %, and an average particle size of 0.25$\mu$ | 0.5 |
| Coupler, C-5 | 0.1 mols |
| High boiling solvent, Oil-3 | 0.6 |
| Gelatin | 1.3 |
| Layer 4: A high speed red sensitive silver halide emulsion layer | |
| AgBrI spectrally sensitized with red sensitizing dyes, S-2 and S-11, having an AgI content of 2 mol % and an average particle size of 0.6$\mu$ | 0.8 |
| Coupler, C-5 | 0.2 mols |
| High boiling solvent, Oil-3 | 1.2 |
| Gelatin | 1.8 |
| Layer 5: An intermediate layer | |
| 2,5-di-t-octylhydroquinone | 0.1 |
| High boiling solvent, Oil-4 | 0.2 |
| Gelatin | 0.9 |
| Layer 6: A low speed green sensitive silver halide emulsion layer | |
| AgBrI spectrally sensitized with green sensitizing dyes, S-12 and S-13, having an AgI content of 4 mol % and an average particle size of 0.25$\mu$ | 0.6 |
| Coupler, M-4 | 0.04 mols |
| Coupler, M-5 | 0.01 mols |
| High boiling solvent, Oil-1 | 0.5 |
| Gelatin | 1.4 |
| Layer 7: A high speed green sensitive silver halide emulsion layer | |
| AgBrI spectrally sensitized with green sensitizing dyes, S-12 and S-13, having an AgI content of 2 mol % and an average particle size of 0.6$\mu$ | 0.9 |
| Coupler, M-4 | 0.10 mols |
| Coupler, M-5 | 0.02 mols |
| High boiling solvent, Oil-1 | 1.0 |
| Gelatin | 1.5 |
| Layer 8: An intermediate layer | |
| The same as in Layer 5 | |

| Sample 2-1 | |
|---|---|
| Layer 9: A yellow filter layer | |
| Yellow colloidal silver | 0.1 |
| Gelatin | 0.9 |
| 2,5-di-t-octylhydroquinone | 0.1 |
| High boiling solvent, Oil-4 | 0.2 |
| Layer 10: A low speed blue sensitive silver halide emulsion layer | |
| AgBrI spectrally sensitized with blue sensitizing dye, S-14, having an AgI content of 4 mol % and an average particle size of 0.35μ | 0.6 |
| Coupler, Y-2 | 0.3 mols |
| High boiling solvent, Oil-1 | 0.6 |
| Gelatin | 1.3 |
| Layer 11: A high speed blue sensitive silver halide emulsion layer | |
| AgBrI spectrally sensitized with blue sensitizing dye, S-14, having an AgI content of 2 mol % and an average particle size of 0.9μ | 0.9 |
| Coupler, Y-2 | 0.5 mols |
| High boiling solvent, Oil-1 | 1.4 |

| Sample 2-1 | |
|---|---|
| Gelatin | 2.1 |
| Layer 12: The first protective layer | |
| UV absorbent, UV-1 | 0.3 |
| UV absorbent, UV-2 | 0.4 |
| High boiling solvent, Oil-1 | 0.6 |
| Gelatin | 1.2 |
| 2,5-di-t-octylhydroquinone | 0.1 |
| Layer 13: The second protective layer | |
| Non-sensitive finely grained silver halide emulsion comprising silver iodobromide containing 1 mol % of silver iodide, having an average grain size, r̄, of 0.08μ, in terms of the silver content of | 0.8 |
| Polymethyl methacrylate particles having a particle diameter of 1.5 μm, | 0.05 |
| surfactant, Su-1 | 0.004 |
| Gelatin | 0.7 |

Besides the above-given compositions, gelatin hardener, H-1, and a surfactant were added into each of the layers.

Sensitizing dye S-11

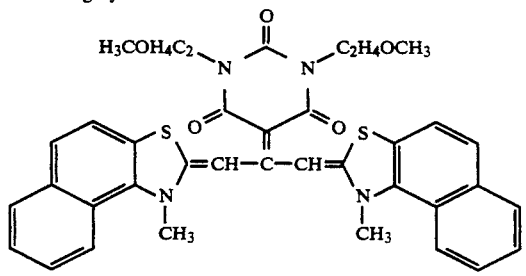

Sensitizing dye S-12

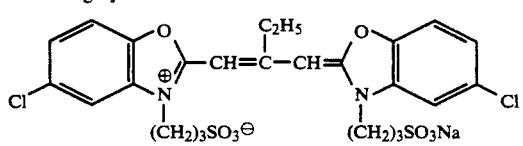

Sensitizing dye S-13

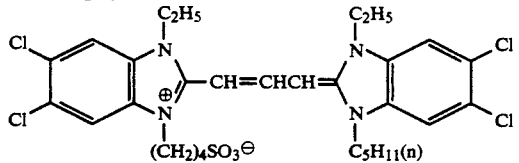

Sensitizing dye S-14

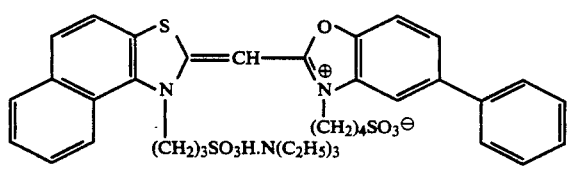

Coupler C-5

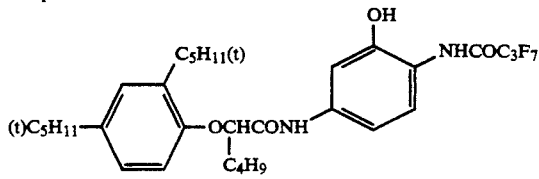

Coupler M-4

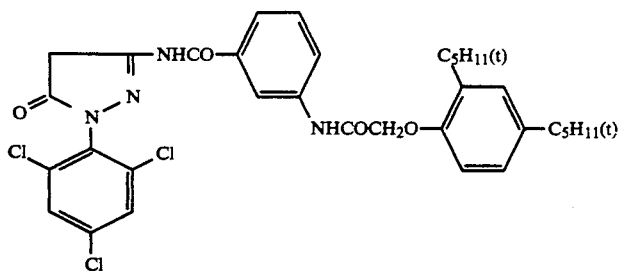

Coupler M-5

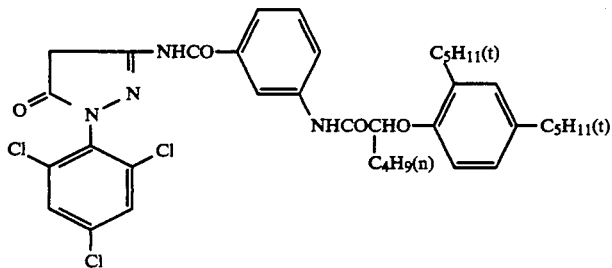

Preparation of Sample 2-2

A multilayered color photographic element, Sample 2-2, was prepared in the same manner as in Sample 2-1, except that the dye shown in Table-2 was dissolved, in place of the ywllo colloidal silver contained in Layer 9, into ethyl acetate together with high boiling solvent, Oil-4, and 2,5-dioctyl hydroquinone and were then dispersed together with gelatin, and the resulting dispersed solution was coated.

Preparation of Samples 2-3 through 2-10

With respect to Samples 2-3 through 2-10 each shown in Table-2, the dyes for each sample were dispersed in solid fine particles in the following procedures by making use of a ball mill.

Water and a surfactant, Alkanol XC —alkylnaphthalene sulfonate manufactured by DuPont— were put in the container of the ball mill and the dyes were added thereinto respectively. The beads of zirconium oxide were further put into the container and the container was closed. The contents of the container were dispersed by making use of the ball mill for 4 days.

After then, an aqueous gelatin solution was added thereinto and the mixture was mixed up for 10 minutes and the beads were moved therefrom, so that a coating solution was obtained. Thus, multilayered color photographic elements 2-3 through 2-10 were prepared in the same manner as in Sample 2-1, except that the above-prepared coating solution was used in place of the coating solution used in Layer 9 of Sample 2-1.

In Samples 2-1 through 2-10, the amounts of the dyes added were each adjusted to be 0.3 g/m$^2$.

The resulting Samples 2-1 through 2-10 were each exposed wedgewise to white light and were then subjected to the following development process:

| Processing step | Processing time | Processing temperature |
| --- | --- | --- |
| First developing | 6 min. | 38° C. |
| Washing | 2 min. | 38° C. |
| Reversing | 2 min. | 38° C. |

| Processing step | Processing time | Processing temperature |
| --- | --- | --- |
| Color developing | 6 min. | 38° C. |
| Adjusting | 2 min. | 38° C. |
| Bleaching | 6 min. | 38° C. |
| Fixing | 4 min. | 38° C. |
| Washing | 4 min. | 38° C. |
| Stabilizing | 1 min. | An ordinary temperature |
| Drying | | |

In the above-given processing steps, the compositions of each of the processing solutions used therein were as follows:

| The first developer | |
| --- | --- |
| Sodium tetrapolyphosphate | 2 g |
| Sodium sulfite | 20 g |
| Hydroquinone.monosulfonate | 30 g |
| Sodium carbonate, monhydrate | 30 g |
| 1-phenyl-4-methyl-4-hydroxymethyl-3-pyrazolidone | 2 g |
| Potassium bromide | 2.5 g |
| Potassium thiocyanate | 1.2 g |
| Potassium iodide, in an aqueous 0.1% solution | 2 ml |
| Add water to make | 1000 ml |
| Reversal solution | |
| Hexasodium nitrilotrimethylenesulfonate | 3 g |
| Stannous chloride, dihydrate | 1 g |
| p-aminophenol | 0.1 g |
| Sodium hydroxide | 8 g |
| Glacial acetic acid | 15 ml |
| Add water to make | 1000 ml |
| Color developer | |
| Sodium tetrapolyphosphate | 3 g |
| Sodium sulfite | 7 g |
| Sodium tertiary phosphate, dihydrate | 36 g |
| Potassium bromide | 1 g |
| Potassium iodide, in an aqueous 0.1% solution | 90 ml |
| Sodium hydroxide | 8 g |
| Citrazinic acid | 1.5 g |
| N-ethyl-N-β-methanesulfonamidoethyl-3-methyl-4-aminoaniline.sulfate | 11 g |
| 2,2-ethylenedithiodiethanol | 1 g |
| Add water to make | 1000 ml |

-continued

| Adjuster | |
|---|---|
| Sodium sylfite | 12 g |
| Sodium ethylenediaminetetraacetate, dihydrate | 8 g |
| Thioglycerol | 0.4 ml |
| Glacial acetic acid | 3 ml |
| Add water to make | 1000 ml |
| Bleacher | |
| Sodium ethylenediaminetetraacetate, dihydrate | 2 g |
| Iron (III) ammonium ethylenediamine-tetraacetate, dihydrate | 120 g |
| Ammonium bromide | 100 g |
| Add water to make | 1000 ml |
| Fixer | |
| Ammonium thiosulfate | 80 g |
| Sodium sulfite | 5 g |
| Sodium bisulfite | 5 g |
| Add water to make | 1000 ml |
| Stabilizer | |
| Formalin, in a 37 wt % solution | 5 ml |
| Konidux, manufactured by Konica Corp. | 5 ml |
| Add water to make | 1000 ml |

Both of the maximum densities, Dmax, and the minimum densities, Dmin, of the developed samples were measured in blue light.

Each of the samples was aged for 4 days under the conditions of a temperature of 55° C. and a relative humidity of 80% and was then exposed to light and treated in the foregoing manners. The resulting sensitivity deteriorations caused in each blue sensitive emulsion layers of the samples were compared with each other in terms of $\Delta S_B$.

$$\Delta S_B = \frac{\text{Sensitivity of a blue sensitive emulsion layer obtained after aging for 4 days at 55° C. and 80% RH}}{\text{Sensitivity of the blue sensitive emulsion layer obtained before forced aging}} \times 100(\%)$$

In the above-given equation, the term, a sensitivity of a blue sensitive emulsion layer, is expressed by a reciprocal number of the exposure quantity of a density of 2.0.

The results obtained are shown in Table-2.

TABLE 2

| Sample No. | Layer 9 | Dmin | Dmax | $\Delta S_B$ |
|---|---|---|---|---|
| Comparative Sample: | | | | |
| 2-1 | Yellow colloidal silver | 0.15 | 3.56 | 94 |
| 2-2 | Comparative dye 1 | 0.14 | 3.70 | 81 |
| 2-3 | Comparative dye 2 | 0.13 | 3.70 | 87 |
| 2-4 | Comparative dye 3 | 0.13 | 3.69 | 88 |
| Inventive sample | | | | |
| 2-5 | Inventive compound 5 | 0.12 | 3.75 | 93 |
| 2-6 | Inventive compound 7 | 0.11 | 3.76 | 94 |
| 2-7 | Inventive compound 8 | 0.11 | 3.74 | 94 |
| 2-8 | Inventive compound 9 | 0.12 | 3.75 | 93 |
| 2-9 | Inventive compound 12 | 0.12 | 3.73 | 94 |
| 2-10 | Inventive compound 23 | 0.11 | 3.74 | 93 |

As compared to the case where yellow colloidal silver was used as shown in Table-1, the samples of the invention were each proved to be high in the maximum densities. In the samples applied with the comparative dyes, on the other hand, they were proved that the maximum densities were high and the sensitivities of the blue sensitive layers were found to be lowered. In contrast to the comparative samples, the samples applied with the compounds of the invention were low in the minimum densities, sufficient in the maximum densities, and excellent in preservability.

Also, in each of the samples applied with the compound 33 of the invention in place of the compound 5 of the invention, it could be confirmed that the effects of the invention were displayed.

Example 3

| <Preparation of the emulsion layer coating solution> | |
|---|---|
| Solution A | |
| Water | 9.7 l |
| Sodium chloride | 20 g |
| Gelatin | 105 g |
| Solution B | |
| Water | 3.8 l |
| Sodium chloride | 365 g |
| Gelatin | 94 g |
| Potassium bromide | 450 g |
| Potassium hexachloroiridate, in an aqueous 0.01% solution | 28 ml |
| Potassium hexabromorhodate, in an aqueous 0.01% solution | 1.0 ml |
| Solution C | |
| Water | 3.8 l |
| Silver nitrate | 1700 g |

In Solution A being kept at a temperature of 40° C., Solutions B and C were added functionally at the same time for 60 minutes while keeping the pH at 3 and the pAg at 7.7 and the mixture was kept stirred for 10 minutes. After then, the pH of the stirred mixture was adjusted to be 6.0 with an aqueous sodium carbonate solution, and 2 liters of an aqueous 20% magnesium sulfate solution and an aqueous 5% polynaphthalene sulfonic acid solution were added. The resulting emulsion was flocculated at a temperature of 40° C. The flocculated emulsion was decanted and then washed, and the salts remaining in the excessive aqueous solution were removed. Next, 3.7 liters of water were added thereto so as to be dispersed and 0.9 liters of an aqueous 20% magnesium sulfate solution was added. The salts remaining in the excessive aqueous solution were removed in the same manner as mentioned above. Thereto, 3.7 liters of water and 141 g of gelatin were added and the mixture was dispersed at a temperature of 55° C. for 30 minutes. Thereby, the particles having a silver bromide content of 38 mol %, a silver chloride content of 62 mol %, an average particle size of 0.25 μm and a monodispersion degree of 9 were obtained. After 140 ml of an aqueous 1% citric acid solution and 57 ml of an aqueous 5% potassium bromide solution were added to the resulting particles, 70 ml of an aqueous 0.1% sodium thiosulfate solution were added and the resulting mixture was ripened at a temperature of 58° C. for 70 minutes.

Into the resulting emulsion, 10 g of 4-hydroxy-6-methyl-1,3,3a,7-tetrazaindene serving as a stabilizer and 1,600 ml of an aqueous 20% gelatin solution were added, and the rinpening treatment was suspended. After then, 3.5 g of the following sensitizing dye (a), 1 g of the same (b) and 1 g of the same (c), and 7 g of compound (d) serving as a contrast hardener, were added. In succession, 10 g of sodium p-dodecylbenzenesulfonate serving as a spreading agent, 30 g of saponin, 120 g of a butyl acrylate-acrylic acid-styrene copolymer serving as a polymer latex, 3 g of potassium bromide serving as a pAg controller and 20 g of a styrene-maleic anhydride copolymer serving as a thickener, were also added. Finally, formalin serving as a layer hardener and glyoxal were further added. Thereby, an emulsion layer coating solution was prepared.

Sensitizing dye (a)

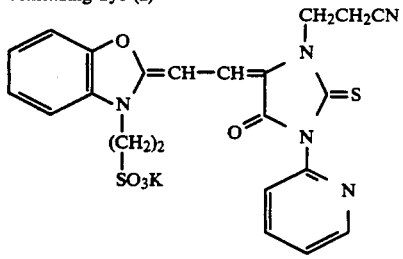

Sensitizing dye (b)

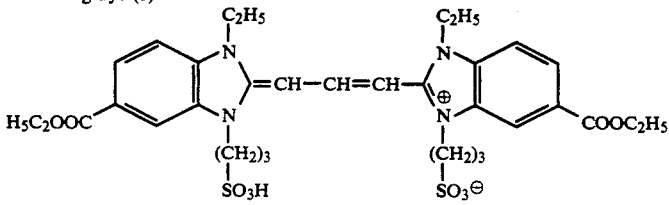

Sensitizing dye (c)

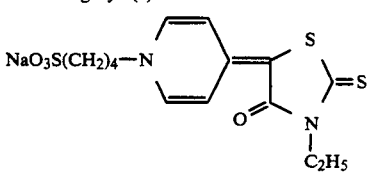

Sensitizing dye (d)

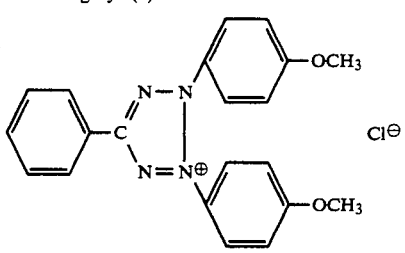

Preparation of Protective layer coating solution

After dissolving 500 g of gelatin in 7.5 l of water, 15 g of the following compound (e) serving as a spreading agent, 10 g of silica having an average particle size of 3.5 μm serving as a matting agent, and formalin serving as a layer hardener, were added. Thereby, a protective layer coating solution was prepared.

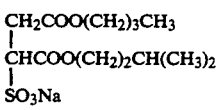  Compound (e)

Preparation of Backing under coat layer coating solution

After dissolving 650 g of gelatin in 10 liters of water, the compounds shown in Table-3 were dispersed so that solid fine particles could be formed in the same manner as in Example 1 and they could be contained in a proportion of 0.2 g/m². After then, 30 g of saponin serving as a spreading agent, 30 g of a butyl acrylate-vinylidene chloride copolymer serving as a polymer latex, 150 g of colloidal silica serving as a physical property improver for coated layers, 3 g of a styrene-maleic anhydride copolymer serving as a thickener, and 2.5 g of glyoxal serving as a layer hardener, were added. Thereby, a backing under coat layer coating solution was prepared.

Preparation of backing over coat layer coating solution

After dissolving 400 g of gelatin in 600 ml, 20 g of polymethyl methacrylate having an average particle size of 4 μm serving as a matting agent, 3 g of sodium bis-(2-ethylhexyl) sulfosuccinate serving as a spreading agent, and glyoxal serving as a layer hardener, were added. Thereby, a backing over coat layer coating solution was prepared.

Preparation of Samples

Onto a subbed 100 μm-thick polyethyleneterephthalate film base, the backing under coat layer and the backing over coat layer were double-coated simultaneously. The, an emulsion layer and a protective layer were coated simultaneously onto the side of the base opposite to the backing layers. The amount of silver coated was 4.2 g/m², and the amounts of gelatin used were 1.95 g/m² into the emulsion layer, 1.2 g/m² into the protective layer, 2.7 g/m² into the backing under coat layer, and 1.0 g/m² into the backing over coat layer, respectively.

The resulting samples were processed with the developer and the fixer each having the following compositions by making use of an automatic processor, Model GR-27 manufactured by Konica Corp., and the halftone dot image qualities and the aging stabilities of the processed samples were evaluated. The results thereof are shown in Table-3.

Halftone dot image quality

The samples were exposed halftonewise to light so as to have a halftoneed area of 90% and were then processed. The resulting halftone image qualities thereof were evaluated by 10 grades. When obtaining the most excellent halftone image quality, it was grade 10; when obtaining the worst quality, it was graded 1; and when obtaining the practically useful levels, it was graded not less then 5.

Aging stability

The resulting samples were rehumidified at a temperature of 23° C. and a humidity of 50% RH and were then brought the emulsion surface side into contact superpositively with the backing surface side, and the both sides were tightly closed. The resulting samples were aged for 5 days under the conditions of a temperature of 50° C. and a relative humidity of 20% RH, and the sensitivities of the aged samples were obtained in terms of the values relative to the value of the same samples obtained before aging and regarded as a value of 100.

The sensitivities expressed herein are the reciprocal numbers of the exposure quantity necessary to obtain a density of 2.5.

| Processing conditions | | |
|---|---|---|
| <Step> | <Temperature> | <Time> |
| Developing | 28° C. | 30 sec. |
| Fixing | 28° C. | 20 sec. approx. |
| Washing | An ordinary temp. | 20 sec. approx. |
| Drying | 45° C. | 20 sec. |
| Composition of Developer | | |
| <Composition A> | | |
| Pure water, ion-exchange water | | 150 ml |
| Disodium ethylenediaminetetraacetate | | 2 g |
| Diethylene glycol | | 50 g |
| Potassium sulfite, in an aqueous 55% w/v solution | | 100 ml |
| Potassium carbonate | | 50 g |
| Hydroquinone | | 15 g |
| 5-methylbenzotriazole | | 200 mg |
| 1-phenyl-5-mercaptotetrazole | | 30 mg |
| Potassium bromide | | 4.5 g |
| Potassium hydroxide | | An amount required for making the pH of the solution to be pH = 10.4 |
| <Composition B> | | |
| Pure water, ion-exchange water | | 3 mg |
| Diethylene glycol | | 50 g |
| Disodium ethylenediaminetetraacetate | | 25 mg |
| Acetic acid, in an aqueous 90% solution | | 0.3 ml |
| 5-nitroindazole | | 110 mg |
| 1-phenyl-3-pyrazolidone | | 500 mg |

When using the developer, the above-given compositions A and B were dissolved in order in 500 ml of water so as to make 1 liter.

| Composition of Fixer | |
|---|---|
| <Composition A> | |
| Ammonium thiosulfate, in an aqueous 72.5% w/v solution | 240 ml |
| Sodium sulfite | 17 g |
| Sodium acetate, trihydrate | 6.5 g |
| Boric acid | 6 g |
| Sodium citrate, dihydrate | 2 g |
| Acetic acid, in an aqueous 90% w/v solution | 13.6 ml |
| <Composition B> | |
| Pure water, ion-exchange water | 17 ml |
| Sulfuric acid, in an aqueous 50% w/v solution | 4.7 g |
| Aluminium sulfate, having an $Al_2O_3$ content of an aqueous 8.1% w/v solution | 26.5 g |

When using the fixer, the above-given compositions A and B were dissolved in order in 500 ml of water so as to make 1 liter.

The resulting fixer had a pH of about 4.3.

TABLE 3

| Sample No. | Compound used | Halftone dot quality | Aging stability 50° C. + 5 days |
|---|---|---|---|
| 3-1 | Comparative dye-2 | 5 | 139 |
| 3-2 | Comparative dye-3 | 6 | 72 |
| 3-3 | Inv. compound 10 | 9 | 103 |
| 3-4 | Inv. compound 11 | 8 | 95 |
| 3-5 | Inv. compound 14 | 8 | 96 |
| 3-6 | Inv. compound 16 | 9 | 102 |
| 3-7 | Inv. compound 23 | 10 | 107 |
| 3-8 | Inv. compound 35 | 9 | 109 |

As is obvious from Table-3 given above, it was proved that the samples 3-3 through 3-8 of the invention were each excellent in halftone dot image quality and also in aging stability.

Example 4

In this example, a silver halide photographic light-sensitive material was prepared in the following manner.

First, an emulsion was prepared in the following manner.

(A) Preparation of a monodisperse type emulsion

The conditions of a reaction furnace were provided to keep a temperature of 60° C., a pAg of 8 and a pH of 2, and a monodisperse type cubic emulsion comprising silver iodobromide having an average grain size of 0.3 µm and a silver iodide content of 2 mol % was prepared in a double-jet precipitation method. According to the electron microscopic observation, the crystallization rate of the twin crystals was not higher than 1%. Serving the crystals of the resulting emulsion as the seed crystals, the crystals were further grown up.

Keeping the gelatin solution at a temperature of 40° C. in the reaction furnace, the resulting seed crystals were added thereinto and aqueous ammonia was further added so as to adjust the pH of the mixture to be 9.5.

The pAg was adjusted to be pAg 7.3 with an ammoniacal silver ion solution and a solution containing ammoniacal silver ionss, potassium iodide and potassium bromide was then added with keeping the pH and pAg constant in a double-jet precipitation method, so that a silver iodobromide layer containing 30 mol % of silver iodide was formed.

After the pH and pAg were adjusted to be 9 and 9.0, respectively, with acetic acid and silver bromide, an ammoniacal silver ion solution and potassium bromide were both added at the same time. After then, they were grown up until the grain size thereof could correspondingly be 90% of the grain size of the crystals completely grown up. At this point of time, the pH was gradually lowered from 9.0 to 8.20.

A potassium bromide solution was added and the pAg was adjusted to be 11. Then, an ammoniacal silver ion solution and potassium bromide were added to grown up while gradually lowering the pH to pH 8, so that a silver iodobromide emulsion having an average grain size of 0.7 μm and a silver iodide content of 2 mol % was obtained.

When preparing the emulsion, the following sensitizing dyes (A) and (B) were added in the amounts of 300 mg and 15 mg each per mol of silver contained in the emulsion, respectively, so that an emulsion was obtained.

Sensitizing dye (A)

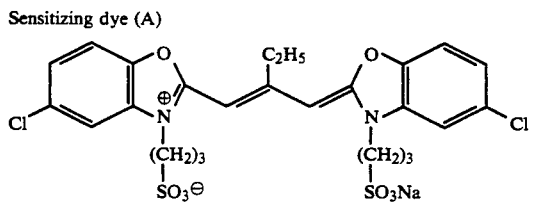

Sensitizing dye (B)

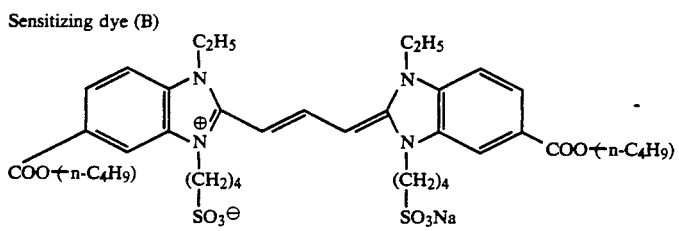

Next, a desalting treatment for removing the excessive salts was carried out, as described below.

While keeping the silver halide emulsion solution at a temperature of 40° C., the following compound (a) —that was Exemplified Compound II-1 disclosed in JP OPI No. 58-140332/1983— was added thereto so as to settle the silver halide grains. After removing the supernatant liquid, pure water having a temperature of 40° C. was then added. Magnesium sulfate was further added so as to settle the silver halide grains again, and the supernatant liquid was removed. The above-mentioned procedures were repeated once more, and gelatin was added, so that an emulsion having a pH of 6.0 and a pAg of 8.5 was obtained.

Compound (a)

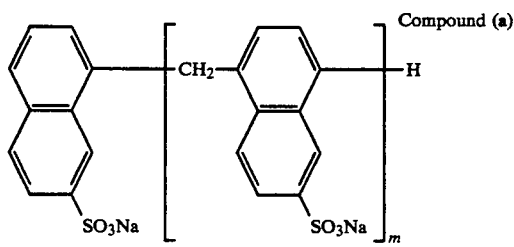

While keeping the temperature of the resulting emulsion at 55° C., a chemical sensitization was carried out with chloroauric acid and hypo and 4-hydroxy-6-methyl-1,3,3a,7-tetrazaindene was added, so that a light-sensitive emulsion was obtained. The resulting emulsion is named Emulsion (A).

To the resulting light-sensitive emulsion (A), the following materials were added as the additives in the following amounts, respectively, so that an emulsion coating solution was prepared.

| | |
|---|---|
| t-butyl-catechol | 400 mg |
| Polyvinyl pyrolidone, having a molecular weight of 10,000 | 1.0 g |
| A styrene-maleic anhydride copolymer | 2.5 g |
| Trumethylol propane | 10 g |
| Diethylene glycol | 5 g |
| Nitrophenyl-triphenyl phosphonium chloride | 50 mg |
| Ammonium 1,3-dihydroxybenzene-4-sulfonate | 4 g |
| Sodium 2-mercaptobenzimidazole-5-sulfonate | 5 mg |

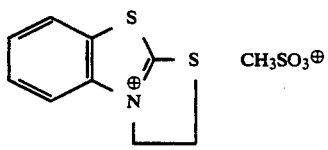 70 mg 1,1-dimethylol-1-bromo-1-nitromethane    10 mg 150 mg

Besides the above, the following coating solution was so prepared as to serve as a protective layer coating solution, in such a manner that the following compounds were added in the following amounts each per gram of gelatin used.

| | |
|---|---|
| $C_9H_{19}\text{-}\bigcirc\text{-}O(CH_2CH_2O)_{12}\text{-}SO_3Na$ (with $C_9H_{19}$ substituent) | 12 mg |
| $C_9H_{19}\text{-}\bigcirc\text{-}O(CH_2CH_2O)_{12}\text{-}H$ (with $C_9H_{19}$ substituent) | 2 mg |
| $\begin{array}{c} CH_2COO(CH_2)_9CH_3 \\ | \\ NaO_3S\text{-}CHCOO(CH_2)_2CH(CH_3)_2 \end{array}$ | 7 mg |
| $\left[\bigcirc(C_9H_{19})\text{-}CH_2\text{-}\right]_n$ with $O(CH_2CH_2O)_{10}H$ (n is a mixture of 2 through 5) | 15 mg |
| $\begin{array}{c} NaO_3S\text{-}CHCOOCH_2(C_2H_4)_3H \\ | \\ CH_2COOCH_2(C_2F_4)_3H \end{array}$ | 5 mg |
| $F_{19}C_9\text{-}O(CH_2CH_2O)_{10}CH_2CH_2OH$ | 3 mg |
| Matting agent comprising polymethyl methacrylate having an average particle size of 7 μm | 7 mg |
| Colloidal silica having an average particle size of 0.013 μm | 70 mg |
| Sodium 2-hydroxy-4,6-dichlorotriazine | 30 mg |

The following sample 4-1 was prepared by making use of the above-given coating solutions.

Sample 4-1

As for the undercoating solution, an aqueous dispersion solution of the copolymer comprising 50 wt % of glycidyl methacrylate, 10 wt % of methyl methacrylate and 40 wt % of butyl methacrylate and having a dilution concentration of 10 wt % was coated on a support, so that a undercoated support was obtained. Next, onto the resulting support, an emulsion layer and a protective layer were each coated on the both sides of the support at the same time so that the amount of silver could be 3.2 g/m² on one side of the support for the emulsion layer and the amount of gelatin could be 0.98 g/m² on one side of the support for the protective layer, each at a coating speed of 140 m/min, respectively.

Example 4-2

To Sample 4-1, a crossover cut layer containing the dye shown in Table-4 was coated so as to interpose it between the emulsion layer and the undercoat layer. The dye was added in the crossover cut layer by making use of a coating solution prepared in such a manner that the dye was dissolved in methanol containing a small amount of triethylamine and the resulting mixture solution was added into an aqueous gelatin solution and, further the pH of the resulting solution was adjusted to be 6.0.

Samples 4-3 through 4-10

As in Sample 4-2, the coating operation was carried out so as to interpose the crossover cut layer therebetween, provided, the dye was added in the same method of dispersing solid fine particles as in Example 1. The amounts of the dyes added into Samples 4-2 through 4-10 were each so adjusted to be 50 mg/m² per sq. meter of the both sides of each of the samples.

The resulting samples were evaluated as follows:

Measurement of sensitometry

As the light source, standard light B described in 'A New Edition: A Databook of Illumination' was used. Both sides of each sample film was exposed to light having one and the same light quantity without using any filter for an exposure time of 0.1 seconds at 3.2 cms. Each of the exposed sample was 45-second treated with a developer XD-SR and by making use of an automatic processor, Model SRX-501 manufactured by Konica Corp., and was then fixed and dried up. After then, the sensitivities of the samples were obtained. The sensitivities were each expressed by a relative value obtained in such a manner that the reciprocal number of each of the exposure quantities necessary to increase the blackened density by 1.0 is obtained and the sensitivity obtained from Sample 4-1 is regarded as a control value of 100.

Evaluation of MTF

An MTF chart having a lead-made rectangular wave pattern of 0.5 to 10 lines/mm was brought into tight contact with the back surface on the front side of a fluorescent screen, Model KO-250 manufactured by Konica Corp., and was then exposed to X rays so that the density could be about 1.0 on the both surfaces of the film surface portions uncovered with the lead-made chart.

The samples exposed to X rays in the above-described manner were developed in the same manner as above, and the recorded rectangular wave patterns were measured by making use of a Sakura Microdensitometer, Model M-5 manufactured by Konica Corp. In the measurements, the aperture size was 300 μm in the parallel direction of the rectangular wave, 25 μm in the vertical direction thereof and the magnification ratio was 20×. The values of the spatial frequencies of 2.0 lines/mm are indicative of the resulting MTF values.

TABLE 4

| Sample No. | Crossover cut layer | Crossover cut material | Sensitivity | MTF |
|---|---|---|---|---|
| 4-1 | None | None | 100 | 0.48 |
| 4-2 | Yes | Inventive compound 46 | 85 | 0.51 |
| 4-3 | Yes | Comparative dye 4 | 89 | 0.54 |
| 4-4 | Yes | Inventive compound 38 | 91 | 0.56 |
| 4-5 | Yes | Inventive compound 39 | 92 | 0.57 |
| 4-6 | Yes | Inventive compound 40 | 94 | 0.58 |
| 4-7 | Yes | Inventive compound 41 | 95 | 0.59 |
| 4-8 | Yes | Inventive compound 42 | 93 | 0.58 |
| 4-9 | Yes | Inventive compound 46 | 94 | 0.59 |
| 4-10 | Yes | Inventive compound 48 | 95 | 0.60 |

Comparative dye 4

-continued

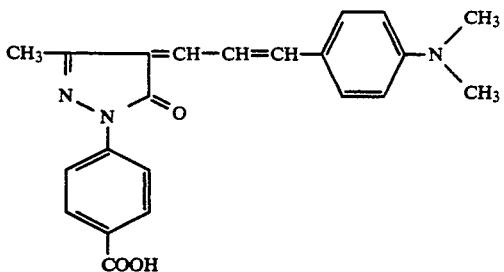

As compared to the comparative samples, the samples of the invention were improved on the image sharpness notwithstanding that the sensitivity lowering could be a few. In each of the samples applied with compounds 60 or 61 in place of the compound used in Sample 4-4 was also proved to be able to display the effects of the invention.

On the other hand, there prepared the following polydisperse type emulsion (B) in place of the foregoing monodisperse type emulsion (A), and tabular-shaped grains (C).

Preparation of polydisperse type emulsion (B)

Making use of the following 4 kinds of solutions, the preparation thereof was made in a normal precipitation method.

| Solution A | |
|---|---|
| Silver nitrate | 100 g |
| Aqueous ammonia, in a 28% solution | 78 cc |
| Add water to make | 240 cc |
| Solution B | |
| Osseous gelatin | 8 g |
| Potassium bromide | 80 g |
| Potassium iodide | 1.3 g |
| Add water to make | 550 cc |
| Solution C | |
| Aqueous ammonia | 6 cc |
| Glacial acetic acid | 10 cc |
| Water | 34 cc |
| Solution D | |
| Glacial Acetic acid | 226 cc |
| Add water to make | 400 cc |

Solutions B and C were poured into a reaction furnace for preparing an emulsion and were then stirred with a propeller type stirrer at 300 rpm, while keeping a reaction temperature of 55° C.

Next, solution A was divided into two parts in a volumetric proportion of 1:2, and the one proportion, that was 100 ml, was poured in by taking one minute. After keeping stirred for 10 minutes, the other 2 volumetric proportion of solution A, that was 200 ml, was then poured thereinto by taking 10 minutes. The resulting mixture of the solutions was further stirred continuously for 30 minutes. After solution D was added, the pH of the solution in the reaction furnace was adjusted to be pH 6.0 and the reaction was suspended.

The average grain size of the resulting silver halide grains was 0.56 μm, and the dispersion degrees thereof were 0.32. The silver iodide content thereof was 1.2 mol %.

Preparation of tabular grains C

Into 1 liter of water, 10 cc of an aqueous 0.5 wt % solution of a thioether compound, [$HO(CH_2)_2S(CH_2)_2S(CH_2)_{20}H$], and 30 g of gelatin were added so as to be dissolved and the resulting solution was kept at a temperature of 70° C. Into the resulting solution, 30 ml of an aqueous silver nitrate solution having a silver nitrate content of 0.88 mols per liter and 30 ml of an aqueous solution of potassium iodide and potassium bromide having a proportion of 3.5:96.5 in terms of mol % were added with stirring in a double-jet precipitation method, so that the grains having an average grain size of 0.60 μm and a silver iodide content of 3.5 mol % could be obtained. Thereinto, a condensed product of sodium naphthalenesulfonate and formalin and $MgSO_4$ were added each in the amount of 24.6 g/mol of AgX. The pH of the resulting mixture was lowered to be 4.0 and was then desalted. After then, gelatin was added in an amount of 15 g per mol of AgX, so that an emulsion could be obtained.

The resulting emulsions B and C were chemically sensitized, that is to say, ammonium thiocyanate, chloroauric acid and hypo were added so that the resulting emulsions were gold-sulfur sensitized.

After completing the chemical sensitization, 4-hydroxy-6-methyl-1,3,3a,7-tetrazaindene was added. After then, potassium iodide in an amount of 150 mg per mol of AgX and sensitizing dyes A and B were added each in the same amounts as in the case of emulsion A, so that a spectral sensitization was carried out. The resulting emulsions are named emulsions B and C, respectively.

To the light-sensitive emulsions B and C, the same additives as in emulsion A were added, so that the emulsion coating solutions could be prepared. By making use of the resulting coating solutions, the foregoing protective layer coating solution and the dyes of the invention in the same ways as in Example 3, the dispersion of solid fine particles was added. When a coating thereof was tried so as to interpose a crossover cut layer between the emulsion layer and the protective layer, the samples having a few reduction of the sensitivities and an improved image sharpness could be obtained.

What is claimed is:

1. A silver halide photographic light-sensitive element having a silver halide emulsion layer on a support, a non-support layer containing fine solid particles having a diameter of 0.005 to 1.0 μm, said particles consisting essentially of a compound represented by $$A=L_1-(-L_2=L_3-)_m-B$$

said compound being present in an amount of 0.0001 to 5.0 g/m², wherein A represents an acidic nucleus of 2-pyrazoline-5-one; B represents aryl substituted at the 4 position with amino substituted with at least one substituent selected from the group consisting of alkenyl, alkynyl, a heterocyclic, or B is a 4-aminoaryl group including a cyclic amino; $L_1$, $L_2$, and $L_3$, each represent methine; m is an integer of 0 or 1; wherein A has at least one substituent selected from the group consisting of carboxyphenyl, sulfonamidophenyl, and aminosulfonylaminophenyl.

2. The element of claim 1 wherein A is substituted with a carboxyphenyl.

3. The element of claim 2 wherein B has at least one substituent selected from the group consisting of alkenyl and alkynyl.

4. The element of claim 3 wherein B is substituted with at least one alkenyl.

5. The element of claim 1 wherein B is 4-aminoaryl including a cyclic amino.

6. The element of claim 1 further comprising a filter layer.

7. The element of claim 6 wherein said fine solid particles are contained in said filter layer.

* * * * *